(12) United States Patent
Van De Groenendaal

(10) Patent No.: US 8,180,328 B2
(45) Date of Patent: May 15, 2012

(54) WIRELESS MANAGER AND METHOD FOR CONFIGURING AND SECURING WIRELESS ACCESS TO A NETWORK

(75) Inventor: Joannes G. Van De Groenendaal, Allston, MA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 13/313,363

(22) Filed: Dec. 7, 2011

(65) Prior Publication Data

US 2012/0079567 A1  Mar. 29, 2012

Related U.S. Application Data

(63) Continuation of application No. 12/341,313, filed on Dec. 22, 2008, now Pat. No. 8,095,115, which is a continuation of application No. 11/136,216, filed on May 24, 2005, now Pat. No. 7,469,139.

(60) Provisional application No. 60/573,870, filed on May 24, 2004, provisional application No. 60/616,683, filed on Oct. 7, 2004.

(51) Int. Cl.
*H04M 1/66* (2006.01)
(52) U.S. Cl. ........................................ 455/411; 455/406
(58) Field of Classification Search .......... 455/406–419, 455/453, 456; 709/203, 227
See application file for complete search history.

(56) References Cited

U.S. PATENT DOCUMENTS

| | | | |
|---|---|---|---|
| 5,214,789 A | 5/1993 | George | 455/33.2 |
| 6,018,652 A * | 1/2000 | Frager et al. | 455/406 |
| 6,212,391 B1 * | 4/2001 | Saleh et al. | 455/456.4 |
| 6,338,082 B1 | 1/2002 | Schneider | 709/203 |
| 6,571,096 B2 | 5/2003 | Plunkett | 455/436 |
| 6,678,717 B1 | 1/2004 | Schneider | 709/203 |
| 6,714,987 B1 | 3/2004 | Amin et al. | 709/249 |
| 6,775,536 B1 | 8/2004 | Geiger et al. | 455/411 |
| 6,834,341 B1 | 12/2004 | Bahl et al. | 713/156 |
| 6,867,683 B2 | 3/2005 | Calvesio et al. | 340/5.52 |
| 6,885,859 B2 | 4/2005 | Karaoguz et al. | 455/408 |
| 7,142,108 B2 * | 11/2006 | Diener et al. | 340/539.1 |
| 7,469,139 B2 | 12/2008 | van de Groenendaal | 455/411 |
| 7,787,863 B2 | 8/2010 | van de Groenendaal | 455/411 |
| 8,095,115 B2 | 1/2012 | Van de Groenendaal | 455/411 |
| 2001/0027378 A1 | 10/2001 | Tennison et al. | 701/213 |
| 2002/0007407 A1 | 1/2002 | Klein | 709/225 |
| 2002/0157024 A1 | 10/2002 | Yokote | 726/6 |
| 2002/0164997 A1 | 11/2002 | Parry | 455/456 |

(Continued)

FOREIGN PATENT DOCUMENTS

WO   WO 03/019907   3/2003

(Continued)

*Primary Examiner* — Kent Chang
*Assistant Examiner* — Kashif Siddiqui
(74) *Attorney, Agent, or Firm* — Pillsbury Winthrop Shaw Pittman LLP

(57) ABSTRACT

The disclosure provides a wireless manager operable to receive a request from a mobile device to wirelessly communicate with a network, wherein the request may include information to dynamically identify a location associated with the mobile device. The wireless manager may be further operable to automatically associate the mobile device with an access zone comprising one or more physical or logical characteristics, compare the location associated with the mobile device to the access zone, and authorize the mobile device to wirelessly communicate with the network if the location associated with the mobile device indicates that the mobile device does not violate the access zone.

18 Claims, 17 Drawing Sheets

U.S. PATENT DOCUMENTS

| | | | |
|---|---|---|---|
| 2002/0173316 A1* | 11/2002 | Jang et al. | 455/453 |
| 2003/0083043 A1 | 5/2003 | Grego et al. | 455/410 |
| 2003/0134637 A1* | 7/2003 | Cooper | 455/432 |
| 2003/0204748 A1 | 10/2003 | Chiu | 713/201 |
| 2003/0225893 A1* | 12/2003 | Roese et al. | 709/227 |
| 2003/0233580 A1* | 12/2003 | Keeler et al. | 713/201 |
| 2004/0009778 A1 | 1/2004 | Makuta | 455/456.1 |
| 2004/0068571 A1 | 4/2004 | Ahmavaara | 709/228 |
| 2004/0098715 A1 | 5/2004 | Aghera et al. | 717/173 |
| 2004/0103282 A1 | 5/2004 | Meier et al. | 713/171 |
| 2004/0198319 A1 | 10/2004 | Whelan et al. | 455/411 |
| 2004/0221155 A1 | 11/2004 | Venkatachary et al. | 713/153 |
| 2004/0221157 A1 | 11/2004 | Venkatachary et al. | 713/155 |
| 2004/0224682 A1 | 11/2004 | Kang | 455/433 |
| 2005/0022001 A1 | 1/2005 | Bahl et al. | 726/13 |
| 2005/0050318 A1 | 3/2005 | Alone et al. | 713/155 |
| 2005/0066200 A1 | 3/2005 | Bahl et al. | 726/4 |
| 2005/0071498 A1 | 3/2005 | Farchmin | 709/236 |
| 2005/0124332 A1* | 6/2005 | Clark et al. | 455/419 |
| 2005/0134696 A1* | 6/2005 | Nath et al. | 348/211.9 |
| 2006/0105810 A1 | 5/2006 | Gnuschke | 455/558 |
| 2006/0217113 A1 | 9/2006 | Rao et al. | 455/422.1 |
| 2006/0236363 A1 | 10/2006 | Heard et al. | 726/1 |
| 2007/0143824 A1* | 6/2007 | Shahbazi | 726/1 |
| 2008/0070495 A1 | 3/2008 | Stricklen et al. | 455/3.01 |
| 2009/0131020 A1 | 5/2009 | van de Groenendaal | 455/411 |

FOREIGN PATENT DOCUMENTS

| | | |
|---|---|---|
| WO | WO 2004/015930 | 2/2004 |
| WO | WO 01/01714 | 1/2007 |

* cited by examiner

WIRELESS MANAGER AND METHOD FOR CONFIGURING AND SECURING WIRELESS ACCESS TO A NETWORK

CROSS-REFERENCE TO RELATED APPLICATIONS

This application is a continuation of U.S. patent application Ser. No. 12/341,313, entitled "Wireless Manager and Method for Configuring and Securing Wireless Access to a Network," filed Dec. 22, 2008, now U.S. Pat. No. 8,095,115, which is a continuation of U.S. patent application Ser. No. 11/136,216, entitled "Wireless Manager and Method for Configuring and Securing Wireless Access to a Network," filed May 24, 2005, which issued as U.S. Pat. No. 7,469,139 on Dec. 23, 2008, and which claims the benefit of U.S. Provisional Patent Application Ser. No. 60/573,870, entitled "Wireless Computing," filed May 24, 2004, and U.S. Provisional Patent Application Ser. No. 60/616,683, entitled "Wireless Security Manager," filed Oct. 7, 2004, the contents of which are hereby incorporated by reference in their entirety.

TECHNICAL FIELD

This invention relates to network administration and, more particularly, to a wireless manager and method for managing wireless devices.

BACKGROUND

The use of mobile devices, such as personal data assistants, laptops, cellular phones, and others, to exchange information and/or perform transactions has and continues to drastically increase. Such devices provide users great latitude in their location when accessing a network. For example, access points to networks such as the Internet may be provided in an office, public place, or other suitable places. As long as the user is within a certain radius of the access point, the user may be able to wirelessly access the associated network. Wireless access potentially presents a number of security risks to both an enterprise and the mobile devices. Certain enterprises or networks implement or allow Wi-Fi Protected Access (WPA) and IEEE 802.11i (WPA2) security standards, which are designed to improve the security of wireless networks and overcome the associated issues with certain Wired Equivalent Privacy (WEP) keys. WPA and WPA2 are similar in their overall functioning, but WPA2 generally provides a more robust and scalable solution to allow for continued enhancements to wireless security. Moreover, some newer operating systems have built-in firewalls and other security mechanisms. Often, users are required to implement the particular security protocol or configure the various security mechanisms, which may require an in-depth understanding of networking and security concepts.

SUMMARY

The disclosure provides a wireless manager operable to receive a request from a mobile device to wirelessly communicate with a network, wherein the request may include information to dynamically identify a location associated with the mobile device. The wireless manager may be further operable to automatically associate the mobile device with an access zone comprising one or more physical or logical characteristics, compare the location associated with the mobile device to the access zone, and authorize the mobile device to wirelessly communicate with the network if the location associated with the mobile device indicates that the mobile device does not violate the access zone.

DETAILED DESCRIPTION

Figure 1:
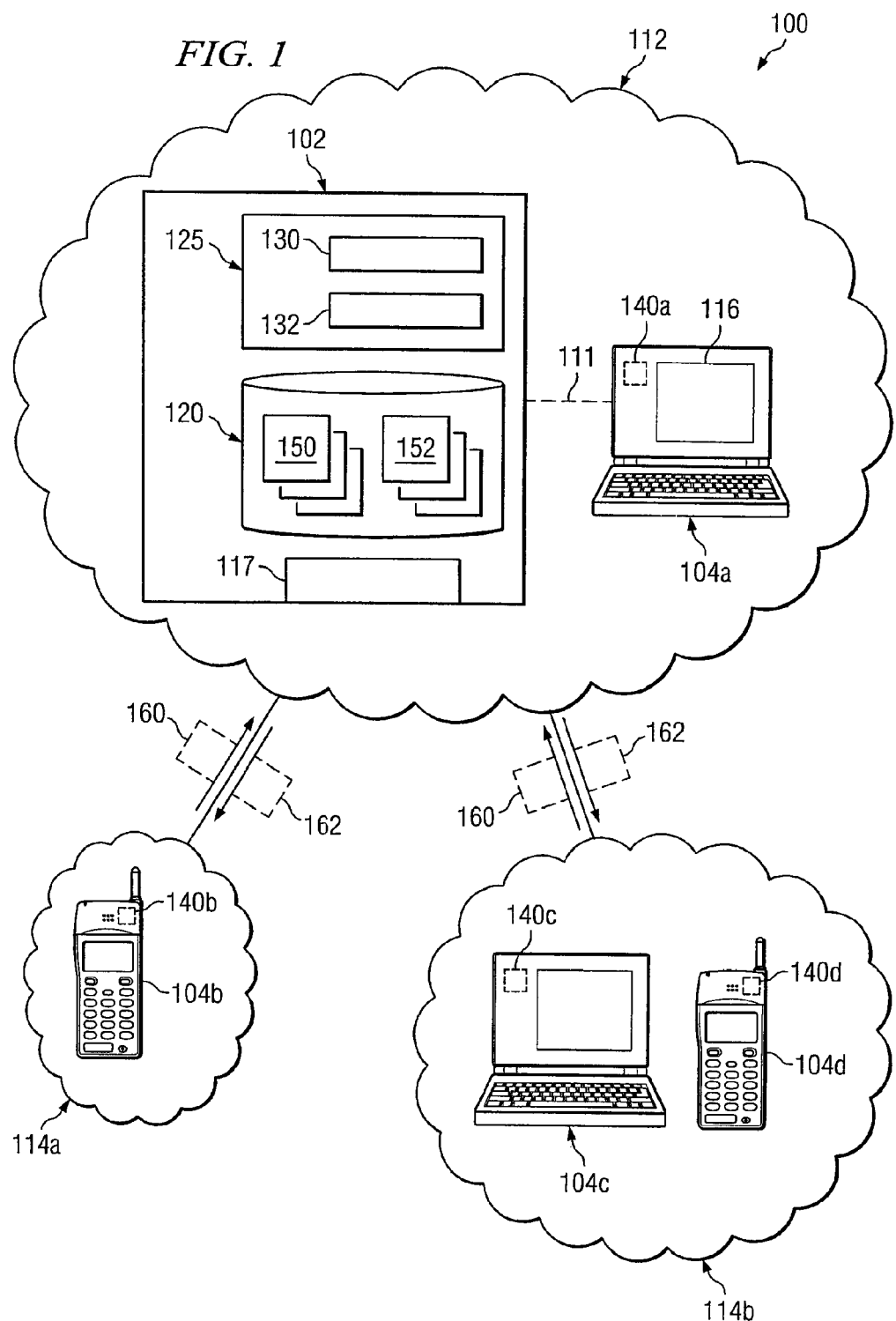
FIG. 1 illustrates an exemplary security management system in accordance with one embodiment of the present disclosure.

FIG. 1 illustrates at least a portion of a wireless security management system 100 in accordance with certain embodiments of the present disclosure. At a high level, this disclosure allows an administrator or other authorized user to configure and secure an enterprise network (e.g., 802.11 wireless network), which may comprise defining, creating, or automatically generating policies/profiles for the various networked entities or devices including end-user devices, access points, wireless gateways, switches, RADIUS servers, Lightweight Directory Access Protocol servers, and such. Often, such management occurs via the enforcement of policies based on the current, location of the end-point. The location may be described by one or more logical or physical characteristics such as a physical location identified by, for example, a set of coordinates (e.g., latitude, longitude, height) as identified by the Global Positioning System (GPS), a set of relative coordinates in an access zone (i.e., a calibrate image of a floor plan with known references such as access points, wireless sensors, or other devices that help with positioning), or logical characteristics such as Internet Protocol (IP) address range, access point with a certain Service Set Identifier (SSID), Basic Service Set Identifier (BSSID), or Extended Service Set Identifier (ESSID), and time. Moreover, a security profile 150 may be enforced directly onto an agent, or by configuring infrastructure entities (e.g., Bluesocket Security Gateway, access points, RADIUS servers) to enforce the security policies. For example, a firewall policy for a given user can be configured or implemented on a wireless gateway when the user enters a particular access-zone, or if the particular mobile device is running an agent, the policy might be enforced via the agent. It should be clearly understood that policy enforcement is typically present, since not being in a defined physical access-zone or logical access-zone in itself implies that a policy will be enforced. Further, the techniques described herein may simplify the configuration of mobile devices in terms of enterprise wireless networks and allows the enterprise to secure and protect corporate assets while the user is on the road. In other words, to aid the user or to provide the enterprise with more control and security, an administrator may dynamically manage these network security features of clients 104 through distributed or referenced security profiles 150 and configuration profiles 152, which may be tailored for the particular client 104. For example, security management system 100 receives a request to access an enterprise network from a mobile device, selects one of a plurality of security profiles 150 associated with the mobile device based, at least in part, on an access point and the user, with each security profile 150 including security protocols for accessing the enterprise network, and automatically transmits at least a portion of the selected security profile 150 to the mobile device. Security management system 100 may dynamically update and/or replace security profiles 150 used by mobile clients 104 as mobile clients 104 accesses the enterprise network 112 through different access points. Securing clients 104 may help protect the enterprise's data and may also help administrators identify vulnerabilities, thereby possibly allowing for revised or new security remediation through profiles 150. Put another way, a network, system, or security administrator, can further automatically control the network security settings of managed clients 104 through an installed agent 140 without requiring certain input or downtime.

In another alternative or complementary embodiment, system 100 may supply, generate, or otherwise process configuration profiles 152. Such profiles allow users or devices of system 100 to configure the mobile assets according to desired parameters or to allow the assets to only connect using certain configurations. For example, using profiles 152, system 100 may monitor in real-time for errors on network 112, configure devices (such as access points, wireless switches, mobile devices, sensors, and others), gather usage information of such devices, monitor performance metrics of the devices, and other similar configuration processes. Indeed, system 100 may be further operable to manage device firmware, discover devices, configure advanced network settings, endpoints, and others. The term "dynamically," as used herein, generally means that certain processing is determined, at least in part, at run-time based on one or more variables. The term "automatically," as used herein, generally means that the appropriate processing is substantially performed by at least part of wireless security management system 100. It should be understood that "automatically" further contemplates any suitable administrator or other user interaction with system 100 without departing from the scope of this disclosure. While described in terms of wireless security, the techniques implemented or performed by system 100 may be used by any wireline, wireless, or hybrid network, illustrated herein as networks 112, 114a and 114b. Moreover, wireless security management system 100 may enforce certain functions or security parameters consistently across disparate or heterogeneous clients 104 and networks 112 and 114. For example, the enterprise may include a profile 150 for all clients 104 that leave the secured or enterprise network 112. In another example, the enterprise may include a plurality of profiles 150 that correspond to or are associated with various business groups or departments. Wireless security management system 100 is typically a distributed client/server system that spans one or more networks such as 112 and 114. But wireless security management system 100 may be in a dedicated enterprise environment or any other suitable environment without departing from the scope of this disclosure.

Turning to the illustrated embodiment, system 100 includes or is communicably coupled with server 102, one or more clients 104, and network 112. Server 102 includes memory 120 and processor 125 and comprises an electronic computing device operable to receive, transmit, process and store data associated with system 100. Generally, FIG. 1 provides merely one example of computers that may be used with the disclosure. As used in this document, the term "computer" is intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer, Macintosh, workstation, UNIX-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server.

Memory 120 may include any memory or database module and may take the form of volatile or non-volatile memory including, without limitation, magnetic media, optical media, random access memory, read-only memory, removable media, or any other suitable local or remote memory component. Illustrated memory 120 includes security profiles 150 and configuration profiles 152, but memory 120 may also include any other appropriate data such as virtual private network applications, firmware logs and policies, firewall policies, a security or access log, print or other reporting files, HTML files or templates, and others. It should be further understood that memory 120 may include any policies, in place of or in addition to example policies 150 and 152, in any particular format. For example, the manager, in addition to being able to define connection and security policies, may apply more complex time-based and access-zone rules to policies. In this example, the access-zone rule can be based on the physical location of the user as defined by latitude, longitude and height, or relative position based on x, y, z coordinates and/or logical characteristics determined by parameters like IP address, gateway, SSID, BSSID, and such.

Illustrated security profiles 150 include any parameters, variables, policies, algorithms, instructions, or rules for securing clients 104 when the asset is remote from the associated server 102. For example, profile 150 may be operable to manage or define parameters involving some or all of the following: access zones, access points, wireless access, firewall settings, network files sharing, ad-hoc networks, wired interface, wireless interface, hacking or other intrusion detection, Internet sharing or bridging, reporting, and data-collection while user is in a non-corporate environment for central security risk assessment. Of course, the above parameters are for example purposes and may not reflect certain embodiments within the scope of this disclosure. Security profiles 150 may further include or indicate automatic actions to take in response to identifying potential attacks such as block port and/or IP address on firewall, disable file shares, disable Internet sharing, disable wired connection, or other suitable actions. Profiles 150 may be associated with clients 104 to any appropriate degree of granularity. For example, security profiles 150 may include an enterprise-wide, a default or a template security profile 150, thereby providing a consistent implementation of security properties and information. In another example, security profiles 150 may store a plurality of individual or user group security profiles 150, each of which may be associated with or tailored for a user and/or device based on certain predefined or dynamic characteristics and allow the administrator or other appropriate user to customize or overwrite the enterprise or template security profile 150. In yet a further example, a particular enterprise may implement a plurality of centralized profiles 150 with a subset of hierarchal profiles 150, each being associated with a particular client 104. Moreover, security profiles 150 may include a collection of predefined user policies. In some embodiments, security profiles 150 may be stored in one or more tables in a relational database described in terms of Structured Query Language (SQL) statements or scripts. In another embodiment, security profiles 150 may be formatted, stored, or defined as various data structures in text files, Extensible Markup Language (XML) documents, Virtual Storage Access Method files, flat files, Btrieve files, comma-separated-value files, internal variables, or one or more libraries. In short, security profiles 150 may comprise one table or file or a plurality of tables or files stored on one computer or across a plurality of computers in any appropriate format. Indeed, security profiles 150 may be local or remote without departing from the scope of this disclosure and store any type of appropriate data.

Illustrated configuration profiles 152 include any parameters, variables, policies, algorithms, instructions, settings, or rules for wirelessly connecting clients 104 with certain networks 112 and 114, in certain embodiments, profile 152 is operable to manage or define settings or parameters involving some or all of the following: general settings, security settings, allow/disallow BSSID, or password protection. Of course, the above parameters are for example purposes and may not reflect certain embodiments within the scope of this disclosure. More specifically, configuration profile 152 may help manage one or more the following components: access zones, access points, wireless access, firewall settings, network file shares, ad-hoc networks, wired interface, wireless interface, hacking and intrusion detection signatures (IDS), collection security information, manage access points, or others. Generally, an access zone is an area that defines a physical geographical region or logical configuration where a user or device has particular access or not. For example, configuration profile 152 may allow some or all of the following characteristics of the access zone to be managed: i) allow/denied—is the user allowed to use wireless when in this geographical space; ii) allowed/disallowed access points— what access points are valid in this access zone (either by SSID, BSSID, ESSID); iii) allowed/disallowed ports; iv) allowed/disallowed servers (IP address); and v) time. Configuration profile 152 may define what access points a user or device may or may not use. For example, access points may be allowed/disallowed based on logical characteristics such as, for example, SSID, BSSID, ESSID, and/or time. In such an example, a rule for in network IP address may be implemented, assuming that the example enterprise has an IP address range of "138.42" and "141.202," as (($ipAddress$ contains "138.42") OR (($ipAddress$ contains "141.202"). If the above rule is not violated or is triggered (as appropriate), then that policy would go into effect for the give schedule. A second example rule, in this case a policy for a third party wireless provider at JFK airport (an end-user when outside of the enterprise network) may be implemented as (($SSID$=="PROVIDER") OR (($SSID$=="JFKWIRELESS")). If this second example rule is true or not violated, then associated policy would be put into effect for the given period of time as defined by the schedule. Configuration profile 152 may include wireless access, which determines whether a particular device is allowed wireless communications with the particular network 112 (or 114) or not. Firewall settings may determine the firewall settings on the end-user device. In certain embodiments, such firewall settings may change according to the access zone settings, which may override fire-wall settings. These firewall settings may include enabled/disabled, time, and ports/protocols (source and destination address). Network file shares may determine whether file-shares are allowed/disallowed based on parameters such as enabled/disabled or time-based. Configuration profiles 152 may allow or disallow the creation of or connectivity to ad-hoc networks, enable/disable a wired interface when the device is connected to a particular wireless network 114, enable/disable a wireless interface when the device is connected to a particular wired network 114, whether or when new IDS signatures may need to be defined and downloaded, and whether to collect security information. Such collected information may include, for example: networks visited (i.e., type of access points—secure/not secure), hacking attempts, performance metrics; whether the associated user attempted to bypass policy (e.g., by shutting agent down or trying to change configuration options), and many others. More specifically, configuration profile 152 may allow the administrator to define the size of security data file, enabled/disabled status, the type of information to collect, the manager update frequency, hacking attempts, and many others. In some cases, the collected information will be stored in an encrypted format. Regardless of the specific parameters included or defined in profile 152, such parameters or sub-profiles may be transmitted to or activated on client 104 when client 104 comes online, when client 104 is provisioned (via a wireline connection or 802.1x, installation from a storage media, and others), or when a forced update takes place. The remainder of profile 152 may be used by the wireless manager to control or otherwise manage behavior of client 104 (e.g., access zones). Profiles 152 may be associated with a group of access points or a single access point. For example, profile 152 may be grouped by site, level, type, custom group, Extended Service Set (ESS), or other criteria. In some embodiments, profile 152 is based on a configuration template associated with a class of access points. For example, the class may be generic, Cisco, Symbol Mobius, generic virtual local area network, or any other suitable class. As with profiles 150, profiles 152 may be stored in one or more tables stored in a relational database described in terms of SQL statements or scripts. In other embodiments, profiles 152 may be formatted, stored, or defined as various data structures in text files, XML documents, Virtual Storage Access Method files, flat files, Btrieve files, comma-separated-value files, internal variables, or one or more libraries. In short, profiles 152 may comprise one table or file or a plurality of tables or files stored on one computer or across a plurality of computers in any appropriate format. Indeed, security profiles 150 may be stored in the tables or files with or associated with configuration profiles 152 without departing from the scope of the disclosure. Moreover, profiles 152 may be local or remote without departing from the scope of this disclosure and store any type of appropriate data. In certain embodiments, one or more configuration profiles 152 may be preinstalled on the mobile device, such as client 104. For example, when the device is provisioned, it may be configured with two types of connection profiles: i) a default in-house profile, which would be in effect when the device is working within the corporation wireless network; and ii) a default on-the-road profile, which is in effect when the device is outside the corporate or other authorized or managed boundaries.

Figure 8A:
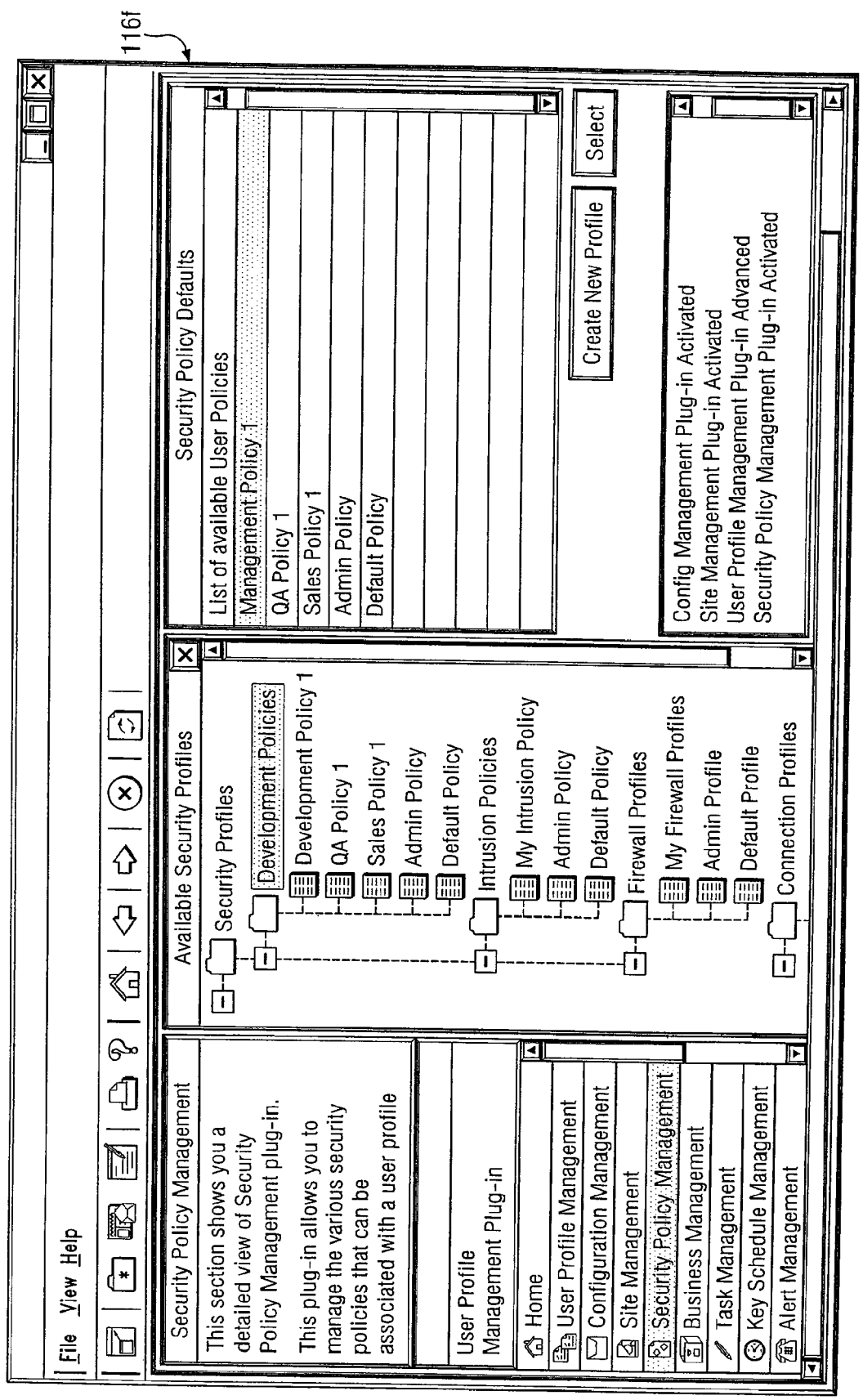
FIGS. 8A-K illustrate exemplary graphical user interfaces associated with administration of a wireless gateway and security profiles in accordance with one embodiment of the present disclosure.
Figure 8B:
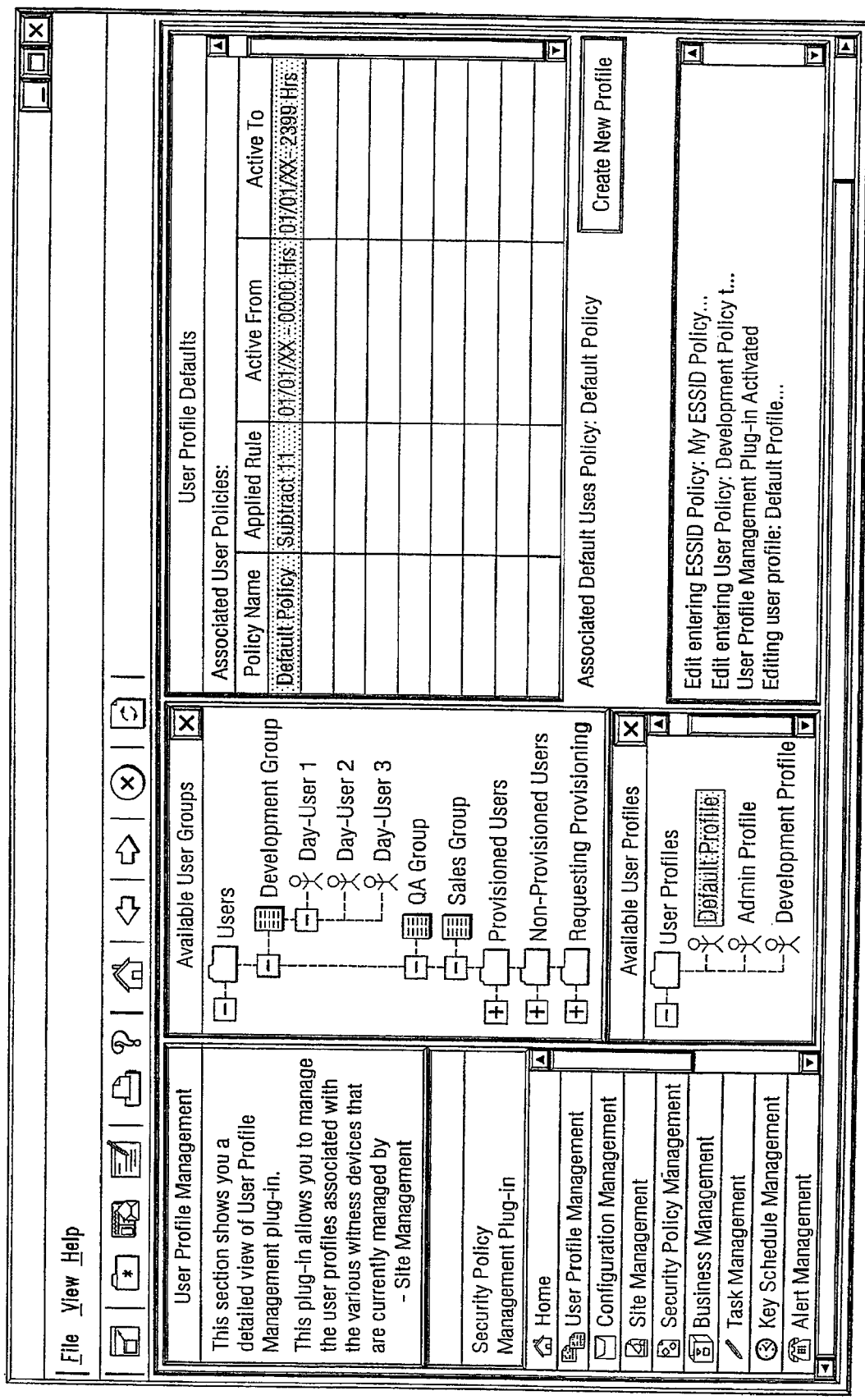
Figure 8C:
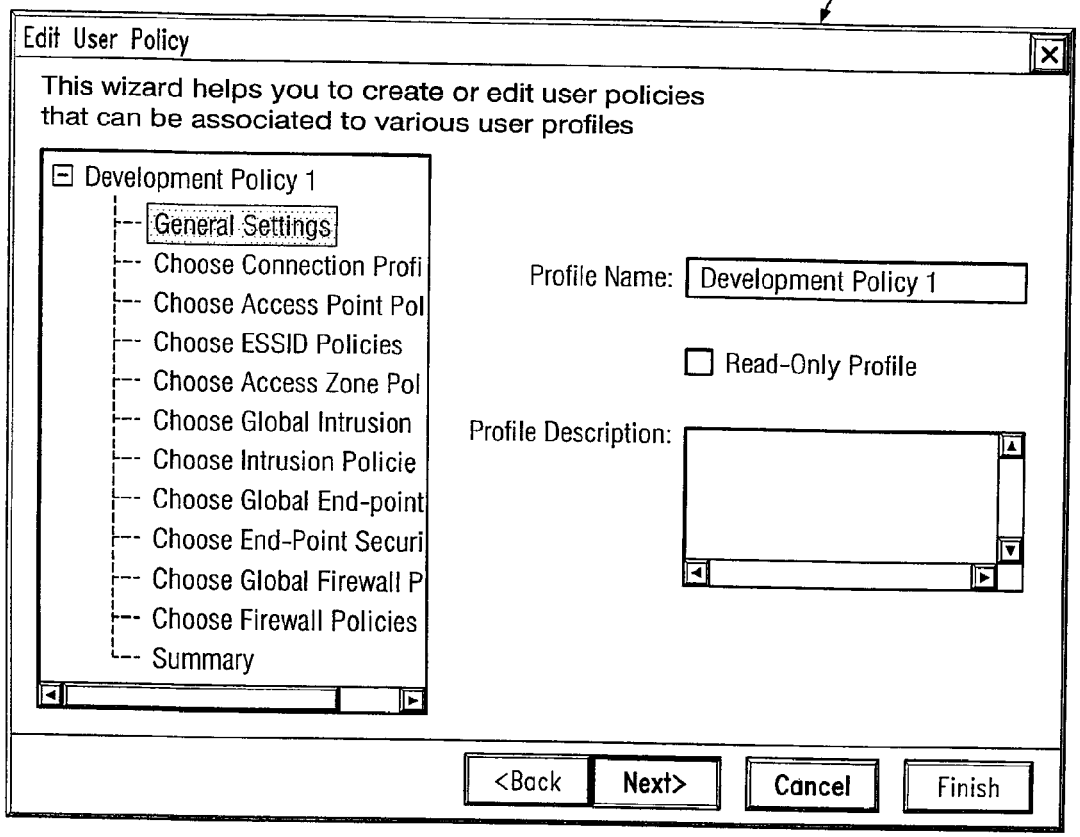

Server 102 also includes processor 125. Processor 125 executes instructions and manipulates data to perform the operations of server 102 such as, for example, a central processing unit, a blade, an application specific integrated circuit, or a field-programmable gate array. Although FIG. 1 illustrates a single processor 125 in server 102, multiple processors 125 may be used according to particular needs and reference to processor 125 is meant to include multiple processors 125 where applicable. In the illustrated embodiment, processor 125 executes a wireless manager, shown as security manager 130 and configuration manager 132. At a high level, the wireless manager is operable to act as a wireless gateway, while monitoring the various mobile devices within its purview. For example, the wireless manager may be operable to determine or identify the physical location of a particular mobile device. In certain embodiments, determining a device's location is based on signal strength measurements and triangulation. For example, the location algorithm may be based on a three-dimensional calculation with a two-dimensional projection. A triangulation algorithm may be implemented that includes a projection onto an x-y plane and the position of the access point will be taken into account when determining a floor that the wireless device is located on. Accordingly, configuration manager 132 may retain or determine the height (z-axis) of the particular access point. The height of the access point is typically defined relative to the floor that it is associated with and, often, the height of the particular client is configurable, but by default is normally set to desk height. In addition, a more traditional triangulation algorithm may be introduced. This algorithm will use matrix algorithms to calculate the expected x, y, z position of the wireless device with a projection onto the x-y plane. Indeed, advanced positioning with sensors and/or GPS may be used to enhance such location processing. This advanced positioning may use a segmented antenna to determine the location of an access point within sixty-degree angles. In addition, it may use a sixty-degree antenna at the top and bottom of the relevant sensor, thereby providing a sector in which a wireless device may be located. This may help place clients in a tighter radius around the sensors. Propagation models may be updated to address the different frequencies that a given access point is operating on, rather than using a generic algorithm. For example, the following predefined sample models may be provided: open office, closed office, factory, airport, and open-space. In another example, the wireless manager may be operable to determine or identify the logical location of a particular mobile device based on SSID, BSSID, IP address, and such. Using such logical information, the wireless manager may allow or prohibit certain wireless communications. An administrator or other authorized user may establish various policies to manage such communications and access. For example, the administrator of the enterprise network may use a portal, such as FIG. 8A or FIG. 8B, then upon selection of certain options, he may be presented with a wizard, such as FIG. 8C, to create policies (such as example policies 150 and 152).

Security manager 130 is any software operable to dynamically implement security profiles 150 to manage security settings and automatically respond to, notify of, or otherwise process hacking and other security breaches. As used herein, "software" includes any combination of hardware, software, or firmware as appropriate. For example, security manager 130 may be written or described in any appropriate computer language including C, C++, Java, J#, Visual Basic, assembler, Perl, any suitable version of 4GL, as well as others. In some embodiments, security manager 130 receives request 160 to access enterprise network 112 from client 104. Request 160 may include a user identifier, an access point identifier, location information, or any other suitable information. For example, location information may allow matrix algorithms to calculate a particular x, y, z position of the mobile device with a projection onto the x-y plane. Based, at least in part, on request 160, security manager 130 identifies a particular security profile 150 associated with the access point and transmits at least a portion 162 of the identified security profile 150 to client 104. For example, security manager 130 may identify a type of wireless connection and the user of client 104 (via user identifier and password) and based on these parameters select the appropriate security profile 150. Once selected, security manager 130 transmits at least a portion of the appropriate security file 150 to agent 140 of client 104. In addition, security manager 130 may transmit a portion of the appropriate security profile 150 to the associated access point. In the event that security manager 130 determines that client 104 changes access points, security manager 130 may activate, update, or replace security profiles 150 to provide appropriate security for the new access point. For example, security manager 130 may receive network and/or security information from agent 140 and transmit an appropriate profile 150 in response to the received information. In some embodiments, security manager 130 may monitor activity of client 104 during a wireless section. For example, security manager 130 may receive location information associated with client 104 and compare the location information to an access zone to determine if client 104 is within the access zone. In response to a violation of the access zone (e.g., entering, exiting), security manager 130 may command or require client 104 to perform an action such as shut down wireless access, block port, disable Internet sharing, and lose other privileges. For example, security manager 130 may implement an access zone around a particular location and prohibit wireless communications within the zone. In another example, security manager 130 may implement a second access zone that allows any wireless device to communicate to a web server through a public access point, thereby allowing clients, customers, or other visitors to access (in perhaps a limited fashion) network communications such as the Internet or email without logging in. Security manager 130 may be further operable to automatically manage encryption keys (such as WEP). Such management may include generation, distribution, rotation, and/or synchronization on access points and mobile devices without significant user involvement.

It will be understood that while security manager 130 is illustrated in FIG. 1 as a single multi-tasked module, the features and functionality performed by this engine may be performed by multiple modules such as, for example, a firewall manager, a policy manager, an administration interface, and a wireless manager. Further, while illustrated as internal to server 102, one or more processes associated with security manager 130 may be stored, referenced, or executed remotely. Moreover, security manager 130 may be a child or sub-module of another software module (not illustrated) without departing from the scope of this disclosure. In one embodiment, security manager 130 may include or be communicably coupled with an administrative workstation or graphical user interface.

Configuration manager 132 is any software operable to automatically discover access points and/or dynamically generate and update configuration profiles 152 in response to discovery. In addition, configuration manager 132 may provide appropriate configuration files 152 in response to a request from a user and/or automatically when the user logs in to network 112. For example, configuration manager 132 may receive a request from the user of client 104 for configuration files 152. Based, at least in part, on information operable to identify the user and/or client 104, configuration manager 132 selects the appropriate configuration file 152 and transmits file 152 to agent 140 to implement. In certain embodiments, configuration manager 132 may be further operable to provide a firmware management feature. Typically, the process of upgrading/downgrading firmware is expensive and time-consuming, especially when multiple access points are deployed. But configuration manager 132 may allow the administrator or authorized user to quickly and easily register a firmware version, schedule firmware delivery, rollback firmware, and download firmware to sensors or access points, as well clients 104, using one of a plurality of protocols. For example, the register firmware version feature often provides a wizard approach, allowing the user (or the automatic agent 140) to register a firmware with the enterprise. As part of the registration process, information pertinent to ensuring that the firmware matches the deployed devices may be captured. The schedule firmware delivery feature may allow the delivery of firmware to access points at an appropriate time so as to help minimize the impact to end-users. In some cases, this feature may allow the end user or administrator to schedule the delivery. The rollback firmware feature may help the user to rollback to a previous version either on demand or through a scheduled delivery. As described above, the firmware may be downloaded using any appropriate protocol including HTTP/HTTPS, Telnet/Secure Shell, and Trivial File Transfer Protocol. Configuration manager 132 may be operable to load-balance clients across multiple access points. The decision on how to load-balance clients may be dynamically based on any number of factors including, for example, load on a particular access point, client distance from the access point, quality of signal being experienced by the device, and such.

It will be understood that while configuration manager 132 is illustrated in FIG. 1 as a single multi-tasked module, the features and functionality performed by this engine may be performed by multiple modules such as, for example, a firewall manager, a policy manager, an administration interface, and a wireless manager. Indeed, while illustrated separately, security manager 130 and configuration manager 132 may represent two processes, objects, threads, or modules within one executable (such as a wireless manager or wireless gateway). Further, while illustrated as internal to server 102, one or more processes associated with configuration manager 132 may be stored, referenced, or executed remotely. Moreover, configuration manager 132 may be a child or sub-module of another software module (not illustrated) without departing from the scope of this disclosure. In one embodiment, configuration manager 132 may include or be communicably coupled with an administrative workstation or graphical user interface.

Server 102 may also include interface 117 for communicating with other computer systems, such as clients 104, over network 112 in a client-server or other distributed environment. In certain embodiments, server 102 receives emails 150 from internal or external senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 and networks 114a and 114b facilitate wireless or wireline communication between computer server 102 and any other local or remote computer, such as clients 104. While the following is a description of network 112, the description may also apply to networks 114a and 114b, where appropriate. Network 112 may be all or a portion of an enterprise or secured network. In another example, network 112 may be a virtual private network merely between server 102 and client 104 across wireline or wireless link 111. Such an example wireless link may be via 802.11a, 802.11b, 802.11g, 802.20, Worldwide Interoperability for Microwave Access (WiMAX), and many others. While illustrated as separate networks, network 112 and networks 114 may be a continuous network logically divided into various sub-nets or virtual networks without departing from the scope of this disclosure, so long as at least portion of network 112 may facilitate communications of profiles 150, profiles 152, and/or other security information between server 102 and at least one client 104. In some embodiments, network 112 includes access points that are responsible for brokering exchange of security information between clients 104 and security manager 130. As discussed above, access points may comprise conventional access points, wireless security gateways, bridges, wireless switches, sensors, or any other suitable device operable to receive and/or transmit wireless signals. In other words, network 112 encompasses any internal or external network, networks, sub-network, or combination thereof operable to facilitate communications between various computing components in system 100. Network 112 may communicate, for example, IP packets, Frame Relay frames, Asynchronous Transfer Mode cells, voice, video, data, and other suitable information between network addresses. Network 112 may include one or more local area networks, wireless local area networks, radio access networks, metropolitan area networks, wide area networks, all or a portion of the global computer network known as the Internet, and/or any other communication system or systems at one or more locations. In certain embodiments network 112 may be a secure network associated with the enterprise and certain local or'remote clients 104.

Client 104 is any computing device operable to connect or communicate with server 102 or network 112 using a wireless connection. At a high level, each client 104 includes at least graphical user interface 116 and a security agent 140 and comprises an electronic computing device operable to receive, transmit, process and store any appropriate data associated with system 100. It will be understood that there may be any number of clients 104 communicably coupled to server 102. For example, illustrated clients 104 include one local client 104 and three clients 104 external to the illustrated portion of network 112. Further, "client 104," "administrator," and "user" may be used interchangeably as appropriate without departing from the scope of this disclosure. For example, the administrator may also be a user of client 104. Moreover, for ease of illustration, each client 104 is described in terms of being used by one user. But this disclosure contemplates that many users may use one computer or that one user may use multiple computers. As used in this disclosure, client 104 is intended to encompass a personal computer, touch screen terminal, workstation, network computer, kiosk, wireless data port, smart phone, personal data assistant, one or more processors within these or other devices, or any other suitable processing device. For example, client 104 may be a personal data assistant (104d) operable to wirelessly connect with external or unsecured network 114 and to execute agent 140. In another example, client 104 may comprise a laptop (104a and 104c) that includes an input device, such as a keypad, touch screen, mouse, or other device that can accept information, and an output device that conveys information associated with the operation of server 102 or clients 104, including digital data, visual information, or graphical user interface 116. Both the input device and output device may include fixed or removable storage media such as a magnetic computer disk, CD-ROM, or other suitable media to both receive input from and provide output to users of clients 104 through the display, namely graphical user interface 116.

Graphical user interface 116 may be operable to allow i) the user of client 104; or ii) an administrator or other authorized user of the wireless manager to interface with at least a portion of system 100 for any suitable purpose. Generally, graphical user interface 116 provides the particular user with an efficient and user-friendly presentation of data provided by or communicated within system 100. Graphical user interface 116 may comprise a plurality of customizable frames or views having interactive fields, pull-down lists, and buttons operated by the user. In one embodiment, graphical user interface 116 presents one or more access zones, each defining distinct or overlapping geographical boundaries within which clients 104 may access enterprise 112. Each access zone is often presented in a graphical format but may be presented in tabular, pop-up, or any other suitable format. Graphical user interface 116 may also present a plurality of management or administration portals. For example, graphical user interface 116 may display a portal that allows users to view, create and manage historical and real-time reports including role-based reporting based on Chief Information Officer, security administrator, network administrator, and such. Real-time dashboards often provide table and graph information on the current state of the managed environment such as number of users currently active at a site, number of rogues detected, security violation events, and others. Graphical user interface 116 is often configurable, supports a combination of tables and graphs (bar, line, pie, status dials, etc.), and is able to build real-time dashboards, where tabs are delineated by key characteristics (e.g., site). Graphical user interface 116 is further operable to generate or request historical reports. Generally, historical reports provide critical information on what has happened including static or canned reports that require no input from the user and dynamic reports that quickly gather run-time information to generate the report. Whether static or dynamic, these reports may include inventory reports, configuration reports, site survey reports, performance reports, and others. Of course, reports may be in any appropriate output format including PDF, HTML, and printable text. It should be understood that the term graphical user interface may be used in the singular or in the plural to describe one or more graphical user interfaces and each of the displays of a particular graphical user interface. Indeed, reference to graphical user interface 116 may indicate a reference to the front-end of either the wireless manager or agent 140, as appropriate, without departing from the scope of this disclosure. Therefore, graphical user interface 116 contemplates any graphical user interface, such as a generic web browser or touch screen, that processes information in system 100 and efficiently presents the results to the user. Server 102 can accept data from client 104 via the web browser (e.g., Microsoft Internet Explorer or Netscape Navigator) and return the appropriate HTML or XML responses using network 112 and, when appropriate, one or more networks 114.

Client 104 also includes, references, or executes agent 140. Agent 140 may be any script, library, object, executable, service, daemon, or other process that implements a security end-point in the wireless network by implementing associated security profiles 150 and/or configuration profiles 152. Generally agent 140 provides an easy and a secure way of connecting to network 112 and managing different types of profiles, gives a list of available networks (e.g., 114a or 114b) with information about security, displays the network connection information in easily understandable and organized format, alerts the user about the security attacks and gives the vulnerability status of the connection end-point, provides the facility of connecting in managed and unmanaged networks (e.g., 112, 114a, and 114b), acts a sensor for other wireless devices, collects and encrypts security information, and often supports advanced security schemes such as WPA and WPA2. In certain embodiments, agent 140 may execute as a hidden service or process that displays events to the user in a managed fashioned without allowing the end user access to the underlying security mechanisms and parameters. Of course, certain embodiments of agent 140 may implement or have none, some, all, as well as additional advantages. Agent 140 may include a list of managed access points and the security mode of each access point along with the associated WEP key schedules. In this case, one or more the following extensions may be provided: security mode (e.g., WEP, WPA, WPA-PSK, 80211i-PSK, 802.11i), associated security principles (WEP-key schedule, PSK key schedule, certificate and Extensible Authentication Protocol to use), or associated security profile 150. Moreover, agent 140 may automatically collect network or security information associated with client 104 and/or networks 112 and 114. For example, agent 140 may collect some or all of the following information: networks visited (i.e., type of access points—secure/not secure), hacking attempts, and/or user attempts to bypass security policies (e.g., shutting down agent 140 or trying to change security configurations). Agent 140 may occasionally be communicably coupled with security manager 130, thereby enabling agent 140 to transmit to and/or receive from information server 102. For example, agent 140 may transmit collected network and/or security information to security manager 130 for updating or replacing associated profiles. In the event that client 104 does not contain the appropriate configuration file 152, agent 140 may transmit a request or retrieve a configuration file 152 and, thus, enabling client 104 to acquire wireless access to enterprise 112. In certain embodiments, agent 140 may include an agent graphical user interface, an agent service, one or more stealth drivers, and one or more adapters; but agent 140 may be implemented using any number of modules in a particular architecture, such as in FIG. 3. In addition, agent 140 is typically communicably coupled with the operating system and/or other components on client 104. Further, agent 140 may allow the end-user (through the agent graphical user interface) to create connection and end-point security profiles 150. In the case of the end-user, end-point security profiles 150 may be enforced either globally or through associated with a particular connection profile. In other words, the end-user is typically restricted from associating more complex logical access-zone rules to policies using agent 140.

In one aspect of operation, agent 140 is installed on a particular client 104 at any appropriate time such as, for example, upon client 104 first entering network 112 or upon request or manual installation by an administrator of network 112 or enterprise. Once installed, agent 140 may include an enterprise or default security profile 150 and configuration profile 152. In combination or alternatively, agent 140 may generate a configuration based on information provided by the user. In this case, client 104 may be required to have permission from the administrator to generate the appropriate configuration profile 152. For example, agent 140 may present a configuration profile wizard through graphical user interface 116 requesting appropriate network or security parameters or settings. In addition, agent 140 may download the appropriate configuration profiles 152 from server 102 via a wireline. Appropriate configuration profiles 152 may be determined based on a single access point, a type of access point, or any other suitable granularity. After client 104 establishes a wireless connection using the appropriate configuration file 152, agent 140 retrieves, receives, or otherwise references or implements the appropriate security profile 150 from security manager 130. The appropriate profile 150 may be determined using any technique including manual selection by the administrator, automatic detection of hardware configuration, operating system, or other criteria, and dynamic association based on the user currently associated with client 104. In certain embodiments, the administrator may group client 104 with other clients 104 based on user type, client type, business unit, or any other suitable categorization or role. This role may be associated with a certain profile 150 and, therefore, may help determine the appropriate profile 150. In certain embodiments, client 104 may be associated with several policies that are dynamically loaded or implemented based on, for example, the particular environment (such as one profile 150 for network 112 and another profile 150 for network 114a).

Agent 140 parses, scans, or identifies the various parameters of the appropriate profile 150. Once identified, agent 140 processes or otherwise implements the respective parameters of profile 150 to secure certain aspects or configurations of client 104. For example, profile 150 may indicate the network file sharing should be disabled on client 104. In this example, agent 140 may automatically interface with the operating system of client 104 to turn off or otherwise disable network file sharing or other privileges. This interface may comprise a real-time continuous link, an application program interface into the operating system, or any other suitable full-time or intermittent link or communication. In some embodiments, a first portion of profile 150 is transmitted to agent 140 and a second portion is implemented by security manager 130. For example, security manager 130 may enforce access zones while the remaining parameters are processed or enforced by agent 140. In the case that enterprise 112 includes a security gateway (e.g., Bluesocket), security manager 130 may push policies (e.g., access zone policies, access point policies, firewall policies) to the security gateway for enforcement. It will be understood that the processing of profiles 150 and 152 and the implementation of the respective parameters may be hidden from the user of client 104.

Figure 2A:
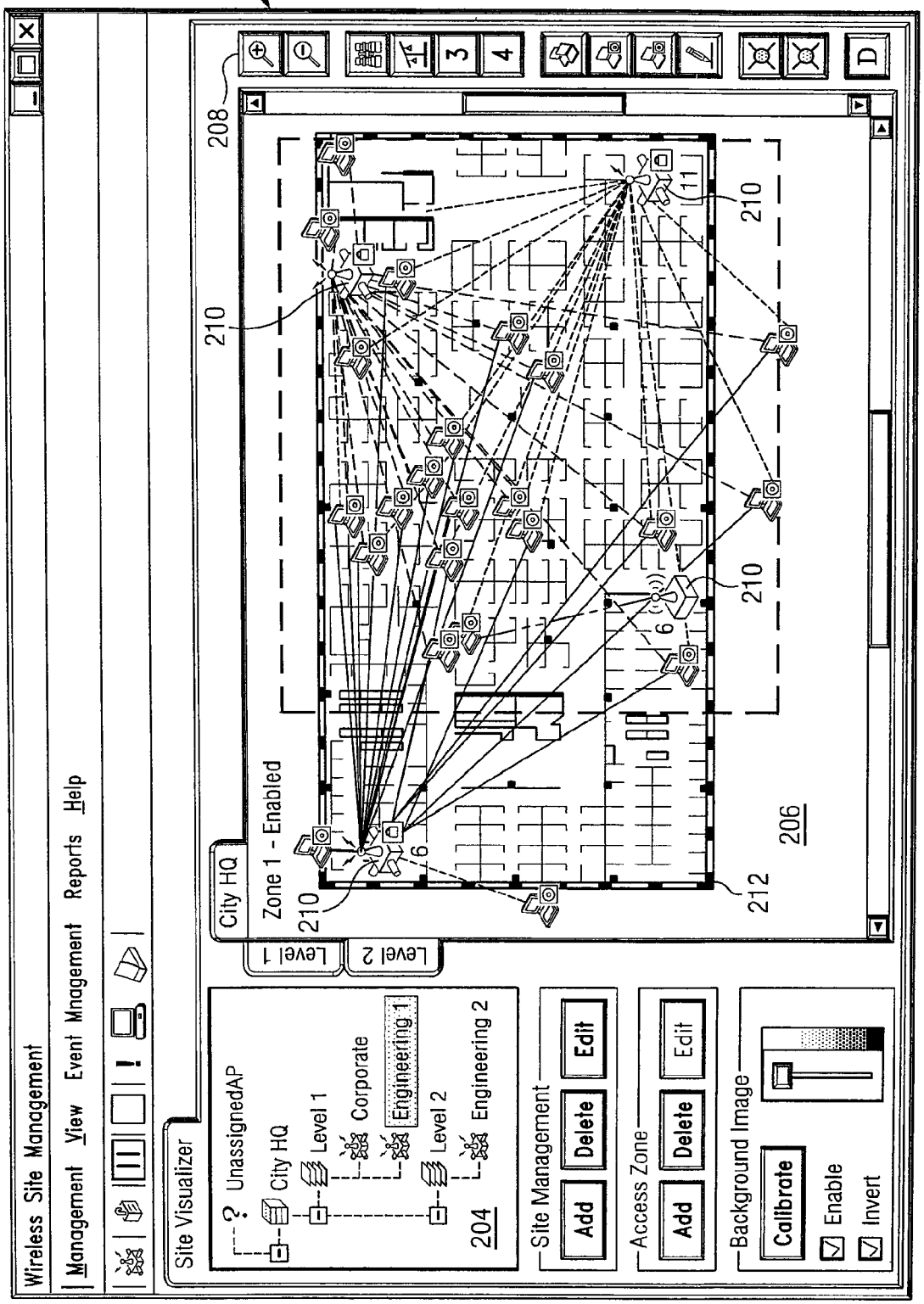
FIGS. 2A and 2B illustrate exemplary displayed access zones in accordance with one embodiment of the present disclosure.
Figure 2B:
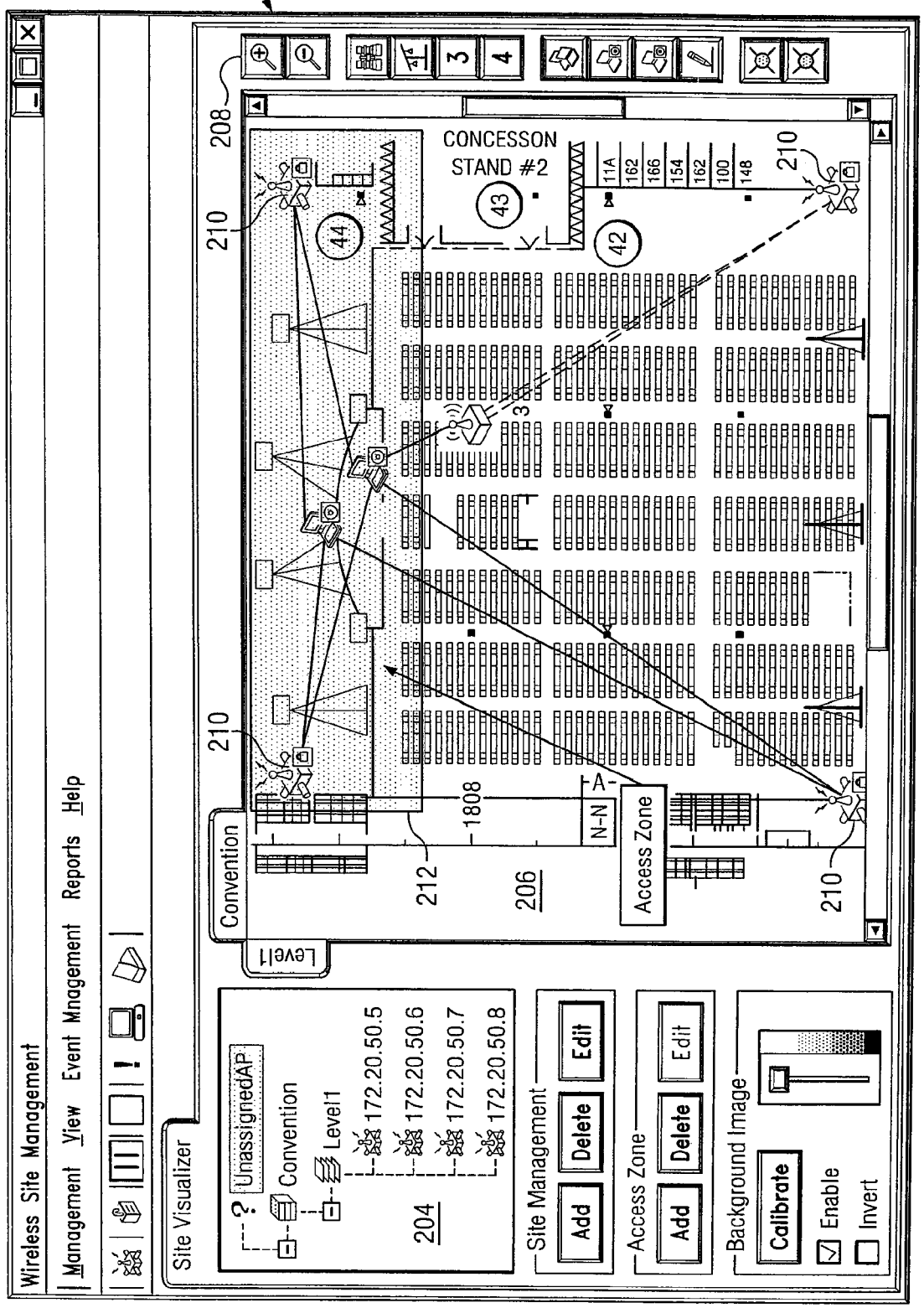

FIGS. 2A and 2B illustrate displays 202A and 202B, respectively, which security manager 130 may present. Generally, displays 202 provide a front end for at least a portion of the processing by the wireless manager. In other words, the wireless manager provides the administrator and/or the user of client 104 with a view of information associated with security profile 150. More particularly, the wireless manger provides a real-time view of access zones and clients 104 relative to those access zones.

In one embodiment, wireless manager presents displays 202, which include a tree 204, a map 206, and a toolbar 208. Tree 204 illustrates a logical organization of location data associated with access points 210 and may provide standard tree processing, such as expanding and collapsing. For example, tree 204 may include sites, levels, access points 210 (see FIG. 2B), or any other suitable granularity. In the illustrated embodiment, each node level of tree 204 is associated with the location such that the root node is associated with the largest location. Successive nodes may then be associated with decreasing locations. For example, the root node may be associated with a building, the next node may be associated with the floor of the building, and the final node may be associated with a portion of the floor (e.g., department). Map 206 displays a map of the location selected in tree 204 and identifies access points 210 and clients 104. In addition, an access zone 212 overlays at least a portion of the displayed location. Access zone 212 identifies the region within which clients 104 may wirelessly access enterprise network 112. In some embodiments, access zone 212 may indicate that clients 104 may not wirelessly access enterprise 212 while within access zone 212. Access zone 212 may include one or more of the following characteristics: allow the user wireless access to enterprise 112 when inside the geographical space identified by access zone 212, what access points 210, ports, and servers (IP address) are available in access zone 212, or time. In the event that client 104 exits access zone 212, agent 140 disables the ability of client 104 to wirelessly access enterprise network 112. In some embodiments, access zone 212 is generated by clicking points within map 206 to define a polygon region. Accuracy of map 206 may depend on several factors such as: a reasonable distribution of access points 210 from which agents 140 can determine received signal strength readings, accurate placement of the access points 210 in the map 206, proper setup of the map 206, and a good calibration of them. Typically, the locations of clients 104 are determined using standard triangulation techniques. Turning to toolbar 208, a user may configure and/or manipulate map 206 using buttons provided by toolbar 208. For example, the buttons may provide one or more of the following: zoom in/zoom out, scan for new access points 210, load balance, auto channel, show agents from other floors, show lines from agents to access points 210, remove all non-fixed rogue access points 210, remove all ad-hoc networks, and others. It will be understood that the illustrated displays 202A and 202B are for illustration purposes only. Displays 202 may include some, all, or different features (not illustrated) without departing from the scope of this disclosure.

Figure 3:
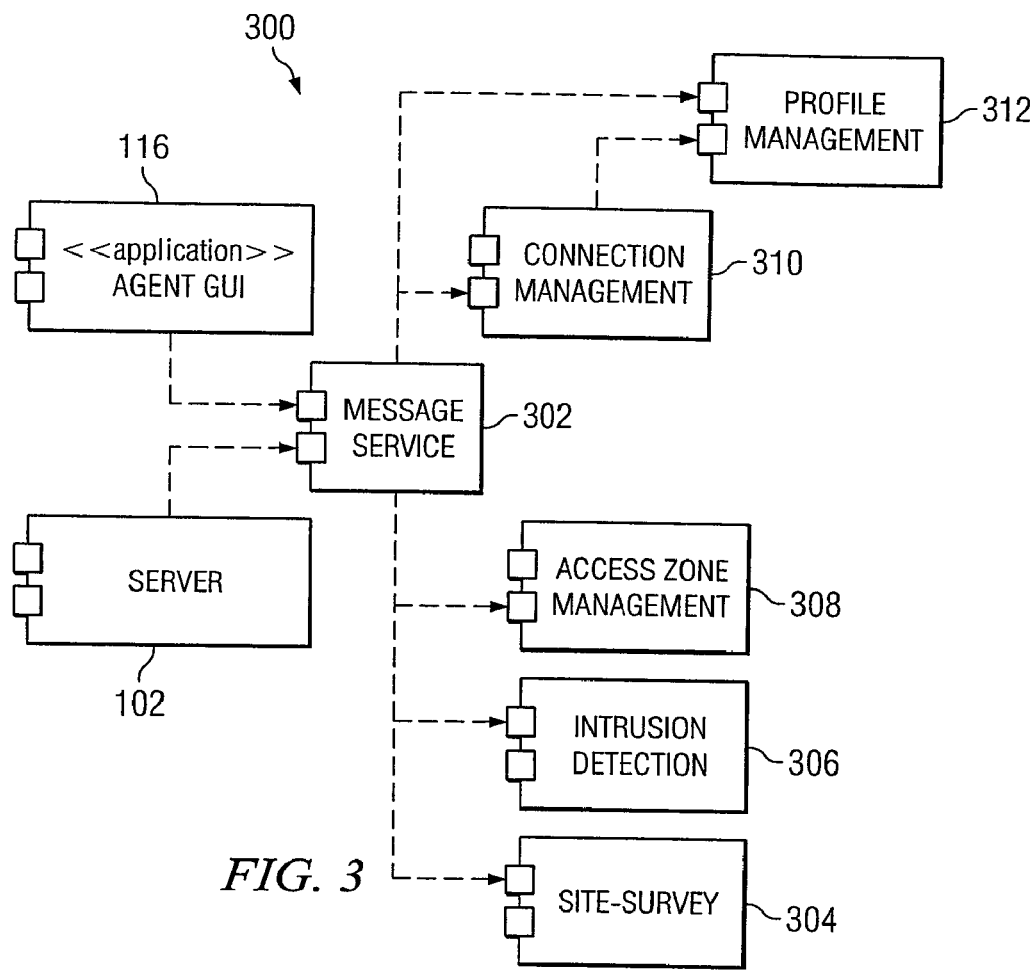
FIG. 3 illustrates an exemplary agent architecture for security management system of FIG. 1 in accordance with one embodiment of the present disclosure.

FIG. 3 illustrates one embodiment of agent architecture 300 that may receive and/or process information received through graphical user interface 116 from server 102 or local repositories. In certain embodiments, agent 140 includes, references, executes, or implements a portion or all of illustrated architecture 300. For example, using one or more of the illustrated modules or processes, agent 140 may be operable to provide the user with a wizard to create/modify/delete of connection profiles 152 with a provision of associating an end-point security profile 150, enforce global end-point security profile 150, provide the user with options to associate different types of profiles, provide a list of detected and managed adapters with associated wireless network connection details such as IP information, provide a list of available networks (such as 114a or 114b) with their signal strengths, security schemes, and SSID/BSSID information, and provide end-point security details with vulnerability status/index based on analysis in graphical format.

Returning to FIG. 3, architecture 300 includes message service 302, site survey 304, intrusion detection 306, access zone management 308, connection management 310, and profile management 312. Message service 302 routes information and/or commands to the appropriate module as illustrated by the dashed lines. Site survey 304 receives and processes site survey information such as, for example, BSSID, SSID (if available), Mode (ad hoc or infrastructure), Security Info, ESSID, and/or time. Intrusion detection 306 processes received information to identify potential attacks, especially in the radio frequency environment. Intrusion detection 306 may be operable to perform one or more of the following: download signatures (e.g., Snort signatures), provide the user/administrator an option to define actions as automated/manual for each signature type group, disable intrusions in the vulnerability assessment dialog with the associated manual actions, log automated actions in the event log; block port and/or IP address on firewall, disable file shares, disable internet sharing, disable wired connection, and execute or request other suitable tasks. Configuration management 308 executes commands and/or processes information in order to configure managed devices. For example, connection management 310 may perform one or more of the following: display discovered devices and the associated configurations and firmware profiles, display available configurations, and depending on which view is clicked on display the appropriate view. Profile management 312 manages profiles available to client 104 when wirelessly accessing enterprise network 112 or other public or private network 114.

Of course, these modules are for illustration purposes only and agent 140 may implement none, some or all of these modules so long as agent 140 is operable to suitably process information according to this disclosure. Indeed, agent 140 may be further operable to present a plurality of portlets to the user of the respective client 104. For example, agent 140 may further include or present a connection summary portlet that provides some or all of the following details or characteristics about the particular network connection:

information of the particular network adapter in use;
a network name (SSID) to which the agent 140 (or mobile device 104) is communicably connected to;
the active connection profile 152 using which the connection is established;
the radio signal strength of the access point to which the agent 140 (or mobile device 104) is communicably connected to;
current security scheme details that are active;
IP properties such as IP address, subnet mask, gateway, Dynamic Host Configuration Protocol details, host and domain details, and Media Access Control (MAC) address;
802.11 details about authentication and encryption; and
advanced details about channel, current end point and connection profiles, vulnerability status, access point MAC address, and firmware details.

Agent 140 may further include or present a network adapter portlet. This portlet may display a network adapter tree view providing the list of available network adapters installed on the device. Such a display may present icons left of the adapter name indicating the status of the adapter such as the one in use. In certain cases, when selecting a particular adapter in the list, the associated details will be updated in a portlets connection summary. In another example, agent 140 may further include or present an available networks portlet that provides the list of networks detected by, for example, the selected adapter in the tree view along with some or all of the following details or characteristics:

connection status to indicate whether the agent is connected to this wireless network or not using intuitive icons;
preferred networks to indicate networks accessed in the past;
SSID of the access point;
security details about the security schemes that are enabled on the respective wireless networks;
802.11 mode to indicate the operating mode of the particular network like ad hoc/infrastructure;
802.11 type such as a/b/g;
radio signal strength detected by the wireless adapter of the wireless network;
BSSID to indicate the MAC address of the access point;
connection profile 152 used to connect to this wireless network; and
security profile 150 that may be associated with the prior connection profile 152.

When a user selects a particular available network 114 in the list, the user may provided with a context sensitive menu with options to connect to the selected network 114 using available connection profiles 152 and also a provision to create a new profile 152 and connect. The same may be achieved by the user selecting a wireless network 114 in the list and clicking on "Connect" button provided below the list. This example menu's options may change according to the selection. If the user selects an already connected network, a "Disconnect" option is often provided to get disconnected from the particular network 114. When a profile 152 is already associated with the selected network 114, on clicking "Connect" the user is connected to the network by displaying the connecting status. In yet another example, agent 140 may further include or present an end-point security details portlet that provides user the vulnerability status based on analysis and the following information, provides the vulnerability status in easily understandable color coded graphical representation, displays the current active end-point security profile 150, provides the list of causes of vulnerability by giving most recent attacks/attempts, and provides user the vulnerability assessment and suggested corrective measures as shown in the following figure.

Figure 4:
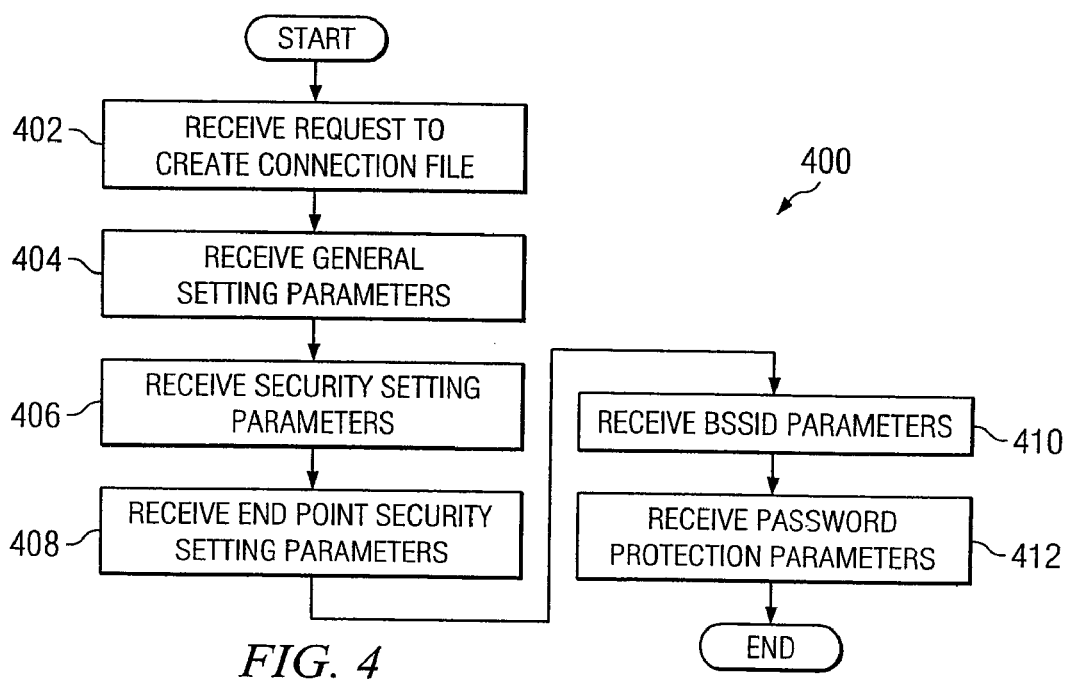
FIG. 4 illustrates an exemplary method for generating a configuration profile in accordance with one embodiment of the present disclosure.
Figure 5:
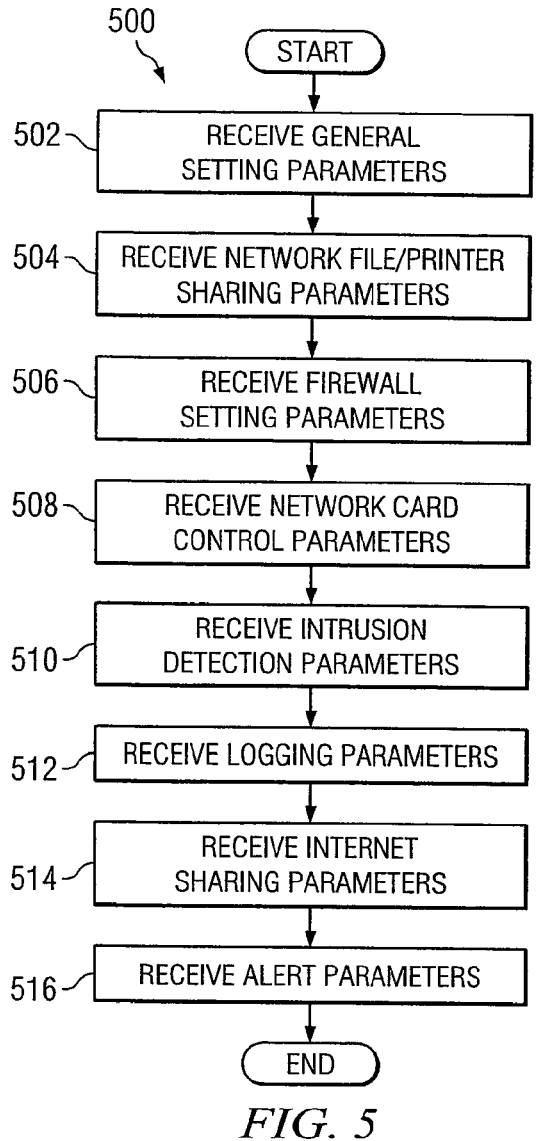
FIG. 5 illustrates an exemplary method for generating a security profile in accordance with one embodiment of the present disclosure.
Figure 6:
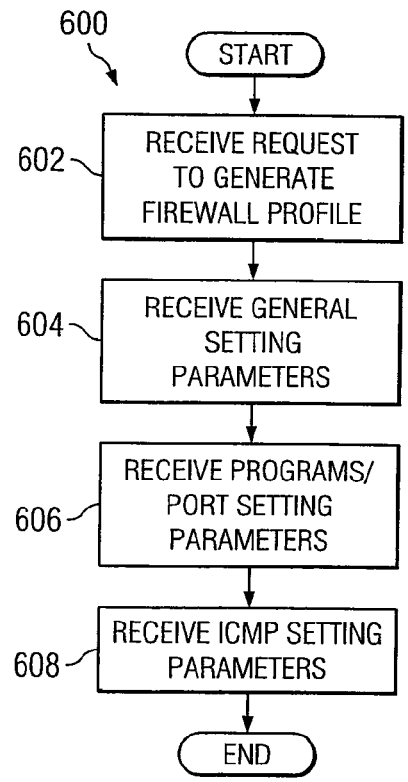
FIG. 6 illustrates an exemplary method for generating a firewall profile in accordance with one embodiment of the present disclosure.

FIGS. 4 to 6 are flowcharts illustrating example methods for developing and providing security profiles 150 to clients 104 in accordance with one embodiment of the present disclosure. At a high level, method 400 includes generating a connection profile 152 to enable an associated client 104 to allow or deny wirelessly communications with enterprise 112, method 500 includes generating a security profile 150 for the associated client 104, and method 600 includes generating a firewall profile associated with security profile 150. The following description focuses on the operation of the wireless manager (i.e., security manager 130 and/or connection manager 132) in performing methods 400, 500, and 600. But system 100 contemplates using any appropriate combination and arrangement of logical elements implementing some or all of the described functionality.

Figure 7A:
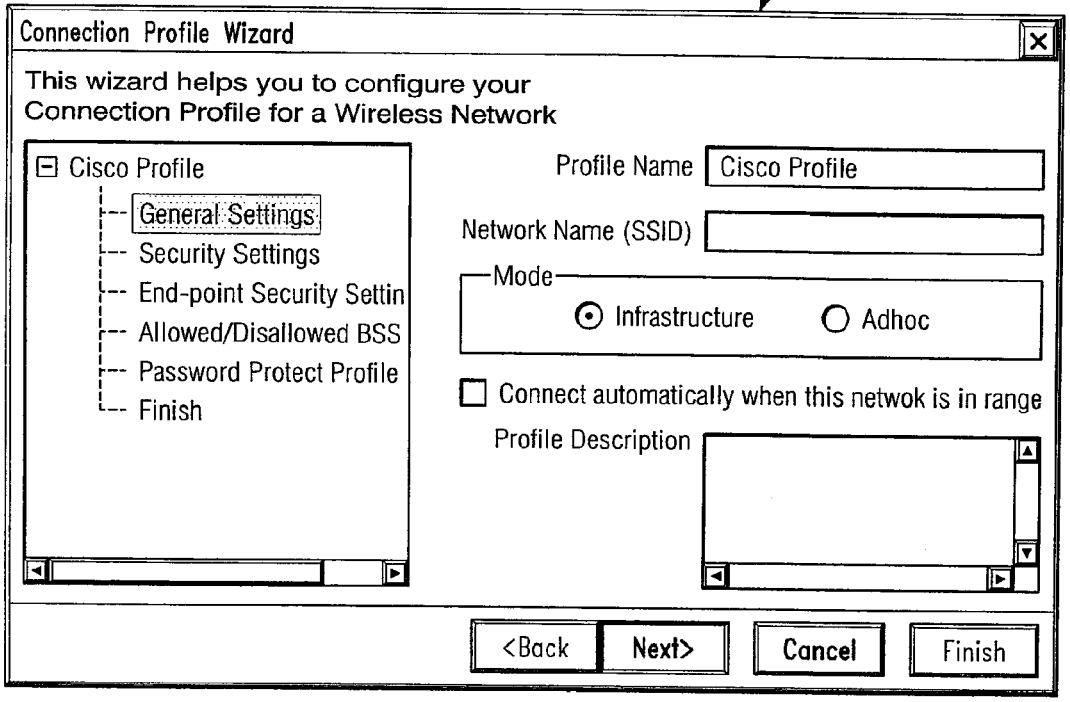
FIGS. 7A-E illustrate exemplary graphical user interfaces associated with certain configuration profiles in accordance with one embodiment of the present disclosure.
Figure 7B:
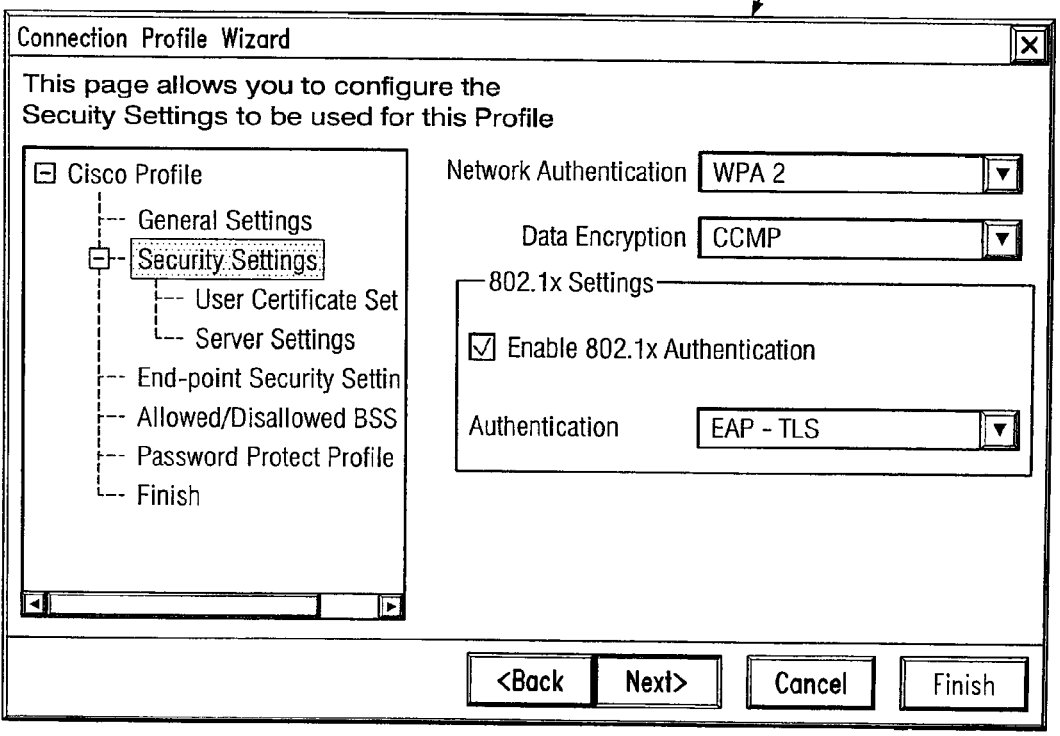
Figure 7C:
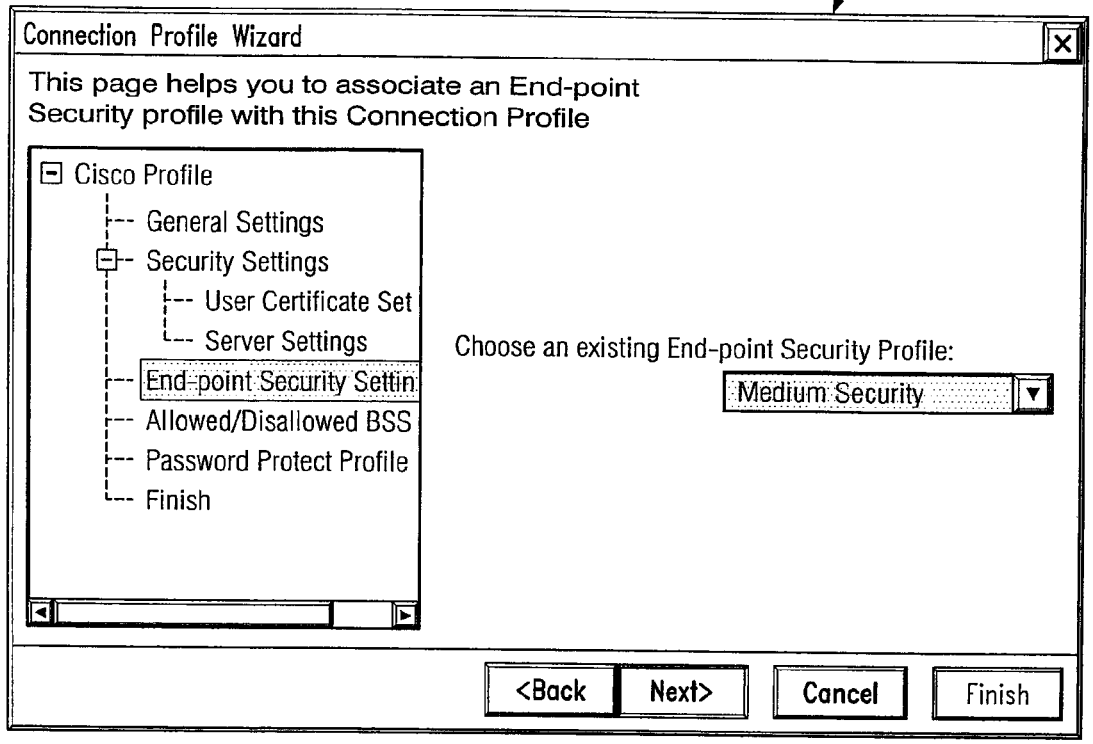
Figure 7D:
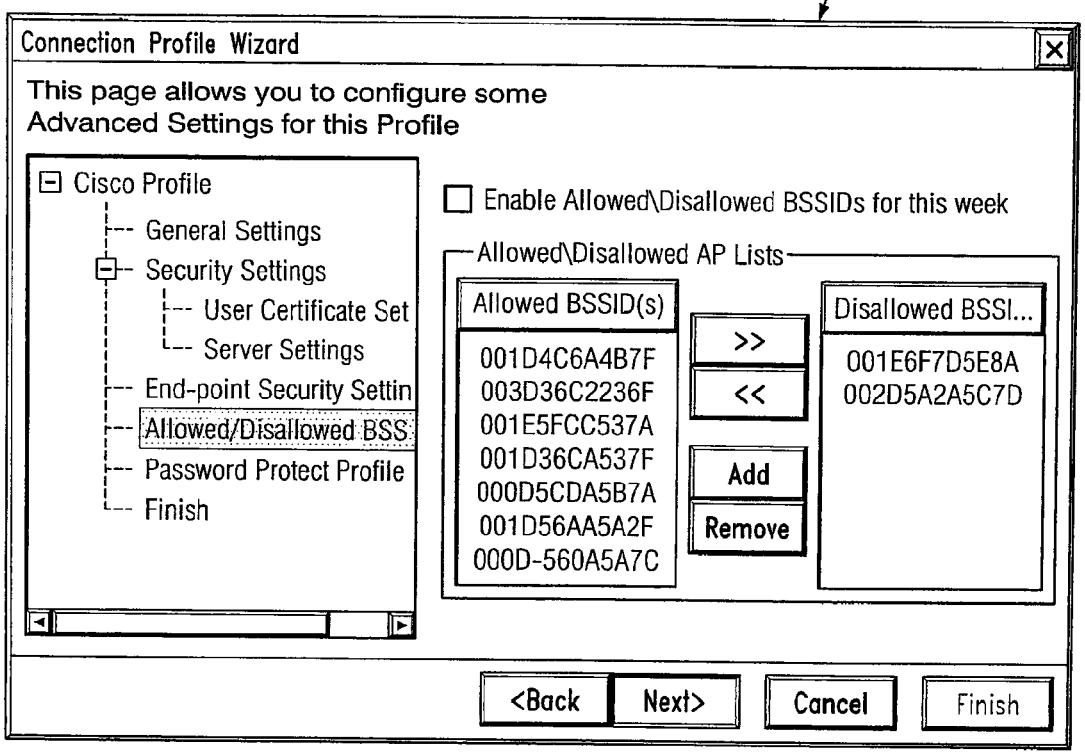
Figure 7E:
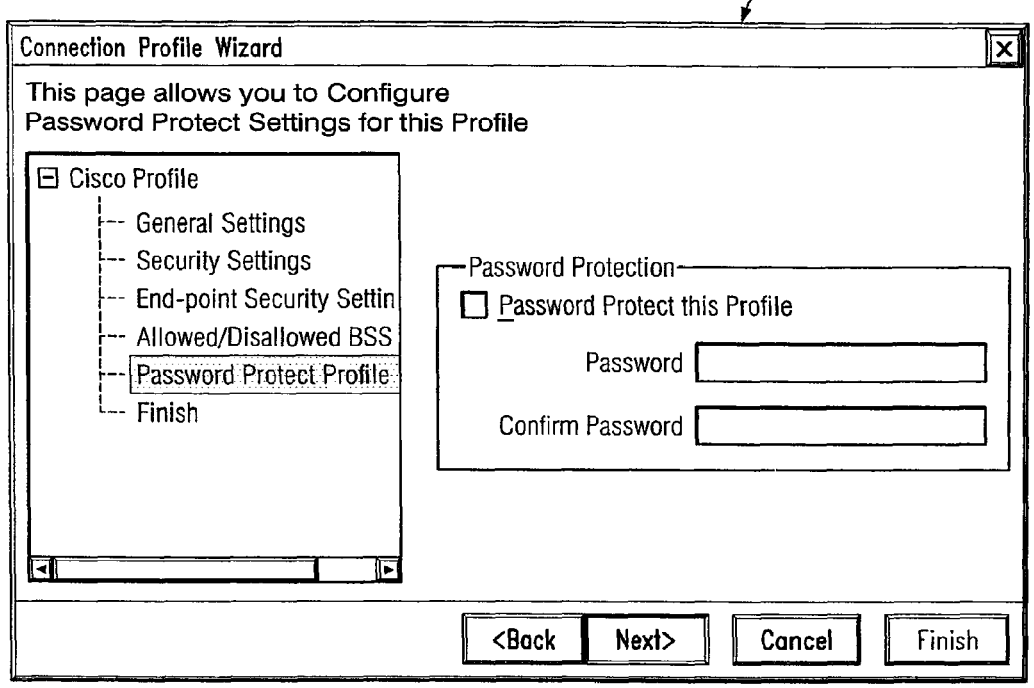

Referring to FIG. 4, method 400 begins at step 402 where connection manager 132 receives a request to create a connection file 152 associated with client 104. In some embodiments, agent 140 prevents client 104 from wirelessly connecting to enterprise network 112 without connection file 152. Connection manager 132 may generate and present a connection profile wizard via graphical user interface 116 for generating and/or modifying connection profiles 152. Next, at step 404, connection manager 132 receives general setting parameters or characteristics. General setting may include one or more the following: profile name, network name (e.g., SSID), mode of the network (e.g., infrastructure, ad hoc), indication whether to automatically connect when this network is in range, profile description, or other suitable parameters. A user of client 104 or an administrator may be prompted to provide such parameters through graphical user interface 116 as illustrated in FIG. 7A. At step 406, configuration manager 132 receives security setting parameters that may be required to wirelessly connect to enterprise network 112. Security settings may include user security settings and/or server settings. For example, security settings may include one or more the following: network authentication, data encryption, 802.1x settings, or other suitable security settings. Network authentication may include username/passwords, keys, certificates, server information, or others, and data encryption typically depends on the selected authentication. A user of client 104 or the administrator may be presented with graphical user interface 116 requesting such information as illustrated in FIG. 7B. Security settings may include Open, WEP, WPA, WPA-PSK, WPA2, WPA2-PSK, Advanced WEP, Advanced PSK, or other settings. Configuration manager 132, at step 408, receives end-point security parameters for identifying how client 104 is protected when connected to this SSID. In some embodiments, a user merely identifies a predefined security profile 150 to associate with the wireless connection (see FIG. 7C). Next, at step 410, configuration manager 132 receives information identifying allowed and/or disallowed BSSIDs (MAC address). For example, configuration manager 132 may receive a list of allowed and disallowed access points (see FIG. 7D) and incorporate the information in configuration file 152. At step 412, configuration manager 132 receives password protection parameters for protecting the associated configuration profile 152. For example, the user may be prompted to enter a password and confirm the password as illustrated in FIG. 7E.

Figure 8D:
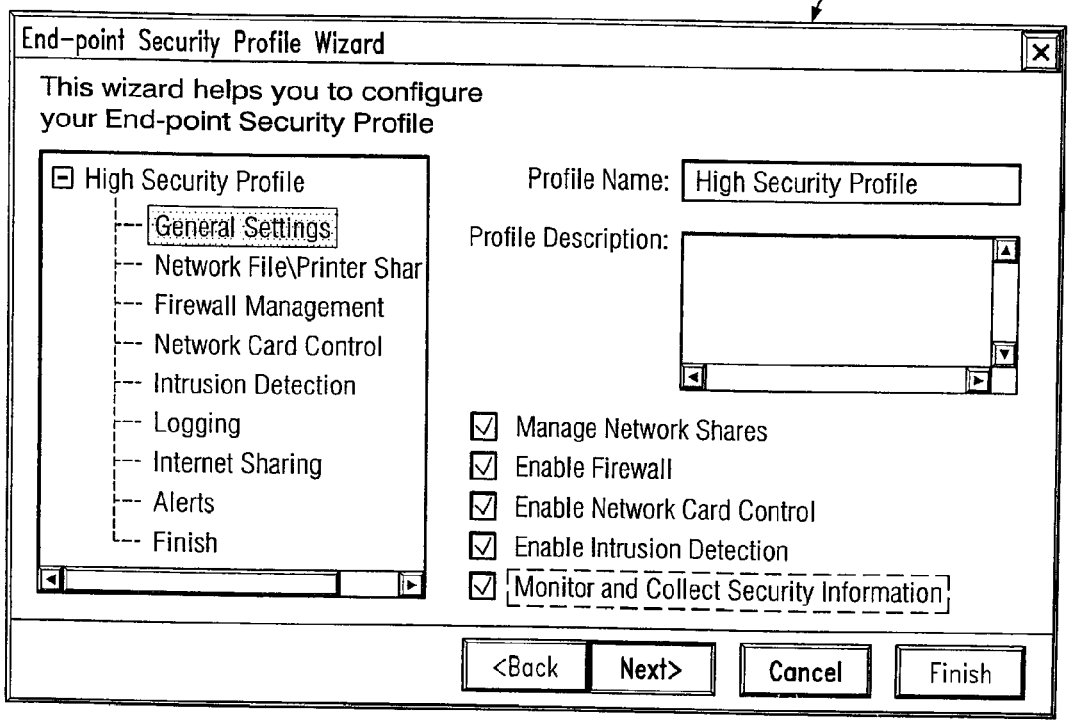
Figure 8E:
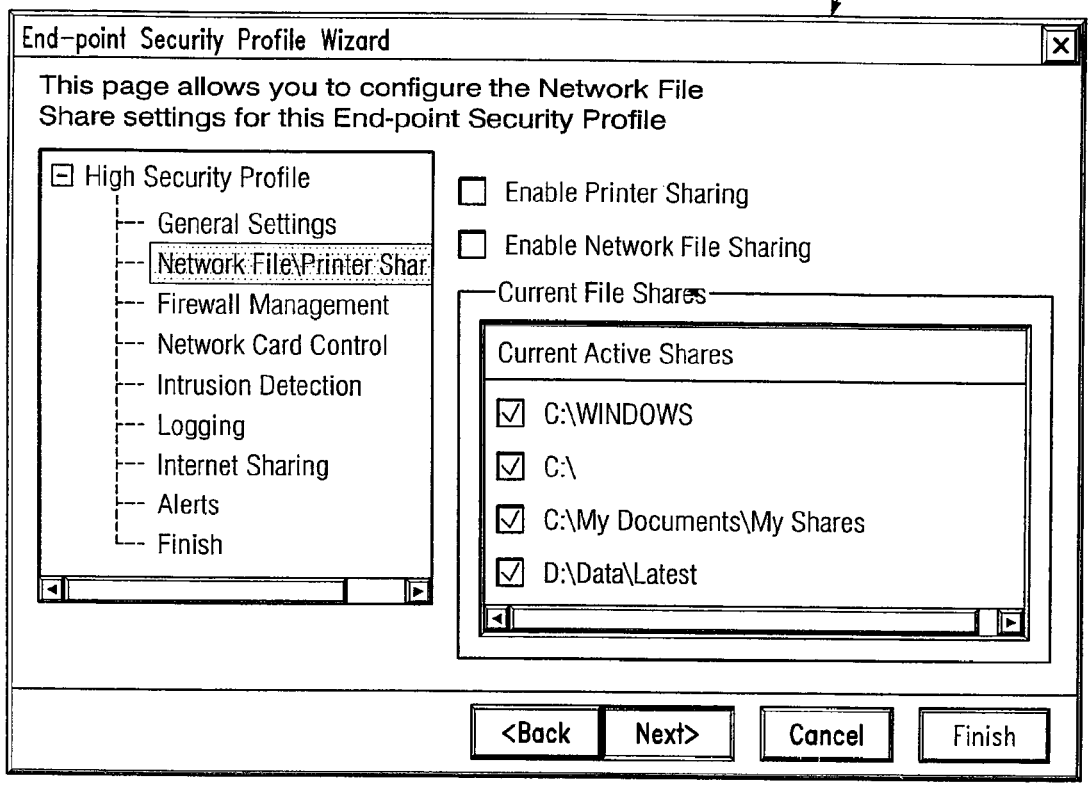
Figure 8F:
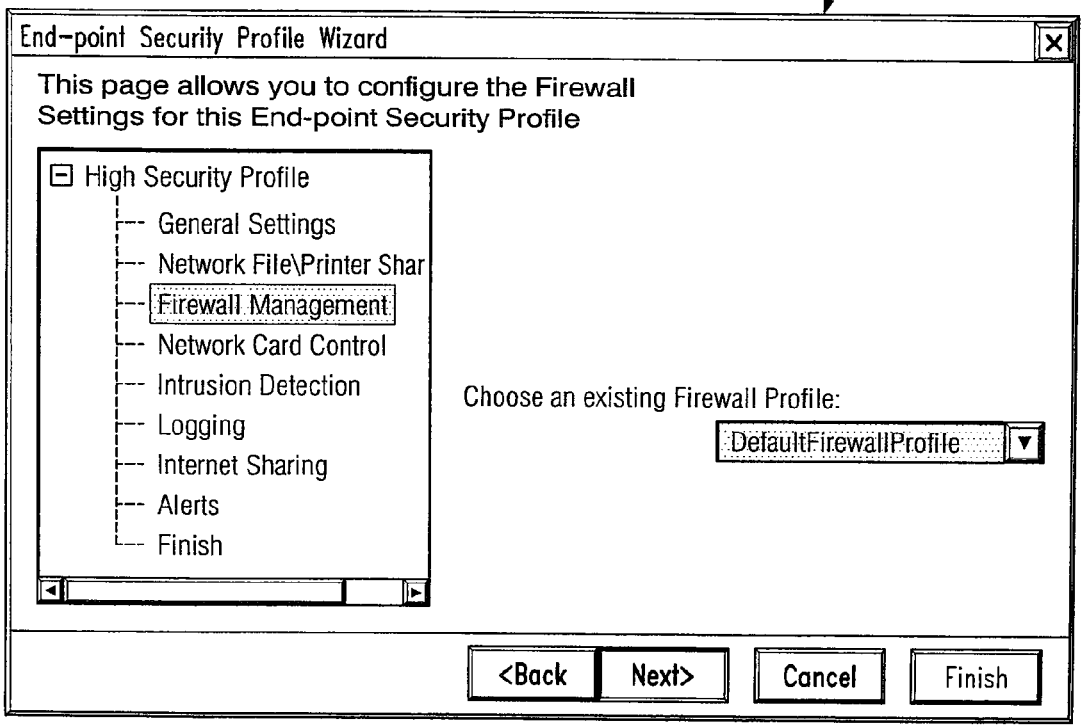
Figure 8G:
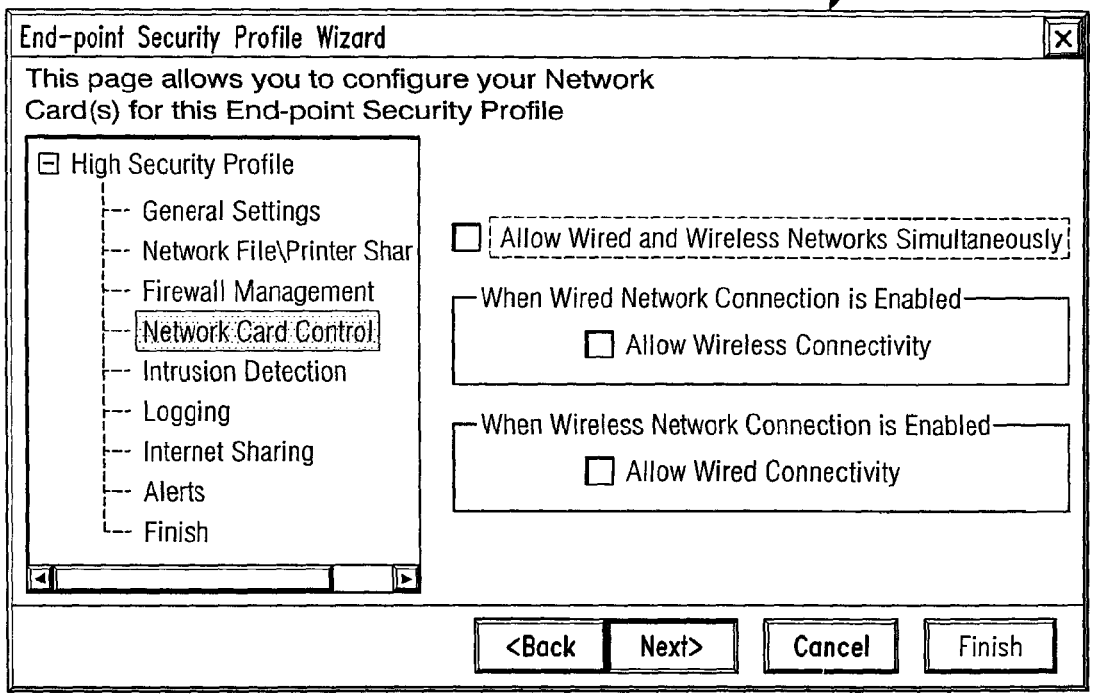
Figure 8H:
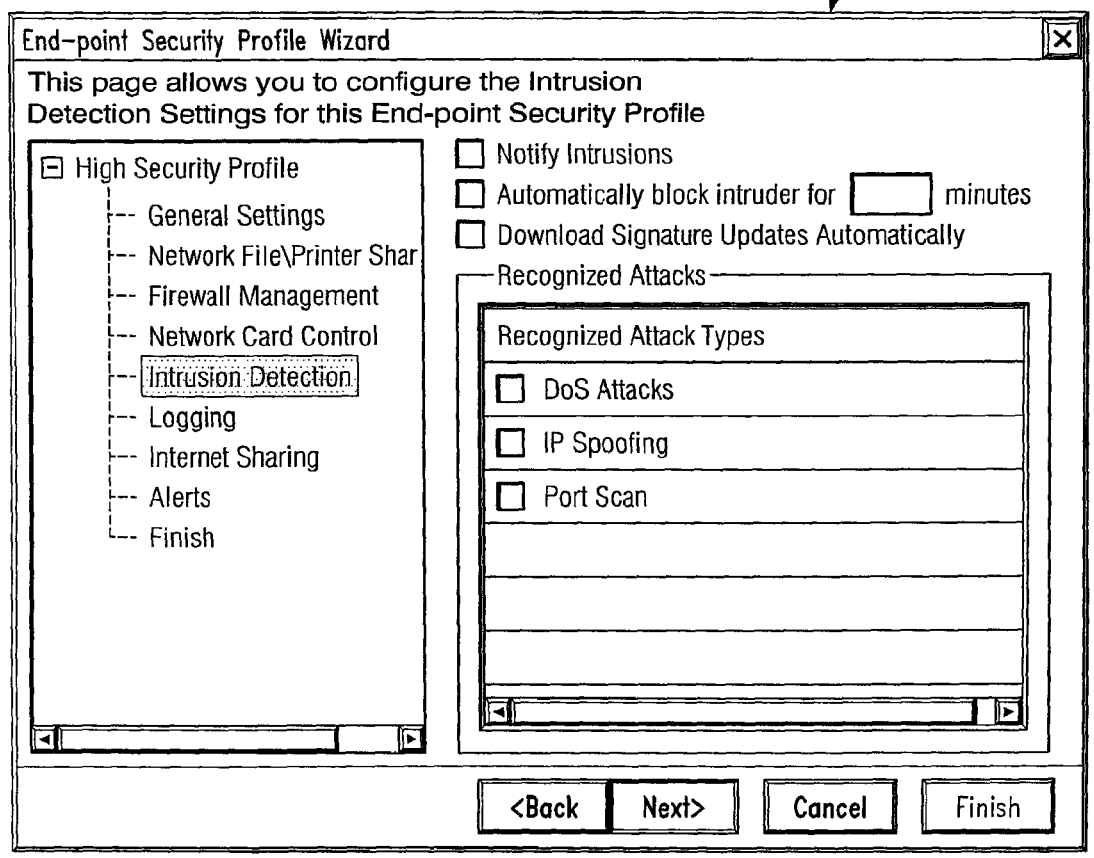
Figure 8I:
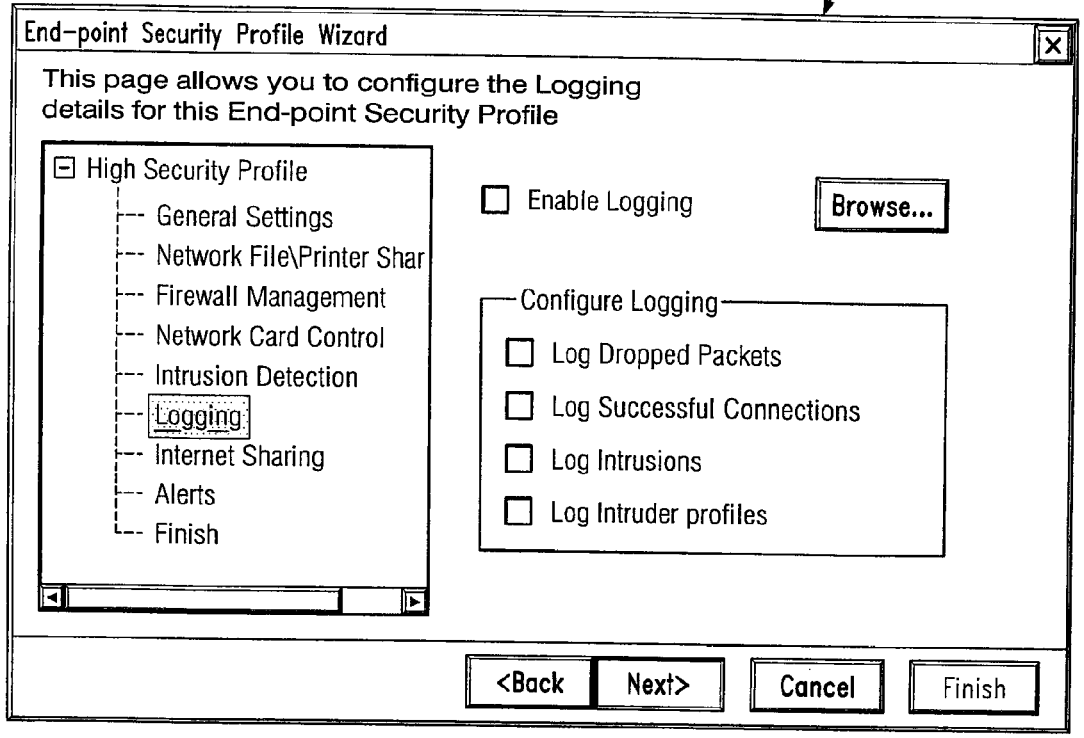
Figure 8J:
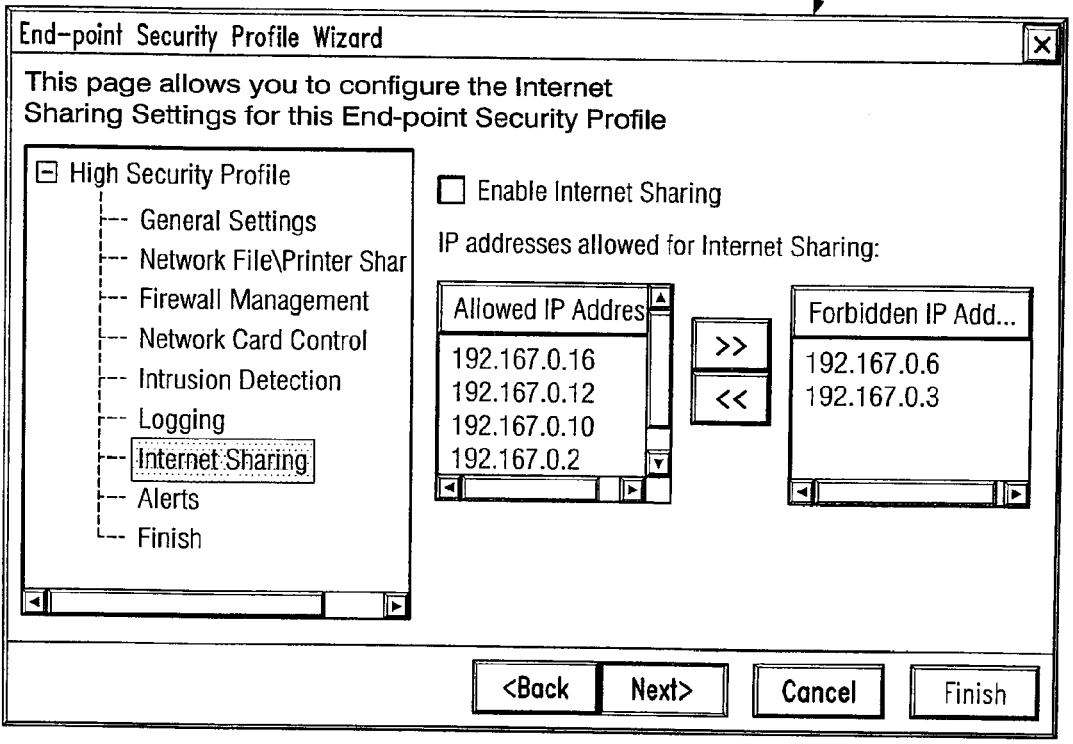
Figure 8K:
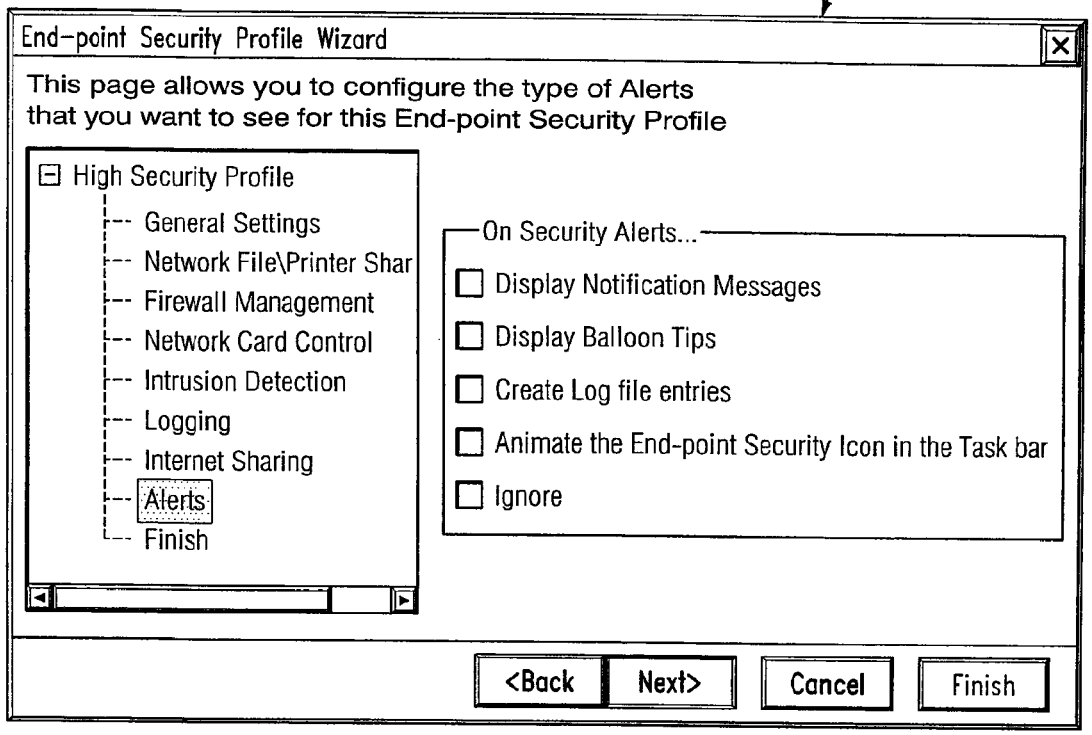

Referring to FIG. 5, method 500 includes step 502 where security manager 130 receives general setting parameters. For example, an administrator may provide a profile name and profile description. In addition, the administrator may select a number of tasks such as one or more the following: manage network file/printer shares, enable firewall, enable network card control, enable intrusion detection, perform intrusion detection, and other suitable tasks. In some embodiments, security manager 130 present graphical user interface 116 to the administrator as illustrated in FIG. 8D. Next, at step 504, security manager 130 receives network file and/or printer sharing parameters for enabling sharing of printers and/or files with client 104 and of files. For example, the administrator may indicate that the printer sharing and network file sharing should be enabled. Upon enabling, security manager 130 may enable a list of current shares on client 104 and may allow the administrator to disable the existing file shares. In some embodiments, security manager 130 present graphical user interface 116 to the administrator as illustrated in FIG. 8E. At step 506, security manager 130 receives firewall setting parameters. For example, the administrator may identify a predefined firewall profile associated with client 104. In another example, the administrator may generate a new firewall policy. Such processes or tasks may be performed through graphical user interface 116 illustrated in FIG. 8F. The security Manager 130 receives network card control parameters at step 508. For example, the administrator may indicate that agent 140 should allow wired and wireless networks simultaneously, enable/disable wireless connectivity when wired network connection is enable, enable/disable wired connectivity when wireless network connection is enable, and other parameters. The administrator may make these indications by selecting a check box as illustrated in FIG. 8G. At step 510, security manager 130 receives intrusion detection parameters. For example, security manager 130 may receive indications to perform one or more of the following: notify intrusions, automatically block intruder for a specified time, automatically download signature updates, specify attack types to monitor (e.g., denial-of-service attacks, IP spoofing, port scan), and other intrusion functions (see FIG. 8H). Next, at step 512, the security manager receives Jogging parameters. For example, the administrator of client 104 may enable logging and/or configure logging. In regards to configuring, the administrator may be able to perform one or more the following: log dropped packets, log successful connections, log intrusions, log intruder profiles, and/or log other activities (see FIG. 8I). The security manager 130 may receive Internet sharing parameters at step 514. For example, the administrator may enable or disable Internet sharing on client 104 and/or identify IP addresses allowed or forbidden from Internet sharing (see FIG. 8J). At step 516, the security manager 130 receives alert parameters identifying actions to be performed in response to detecting a security alert. For example, security manager 130 may perform one or more the following in response to a security alert: display notification messages, display balloon tips, create log file entries, generate the endpoints security icon in the task bar, ignore, or other suitable tasks (see FIG. 8K).

Figure 9A:
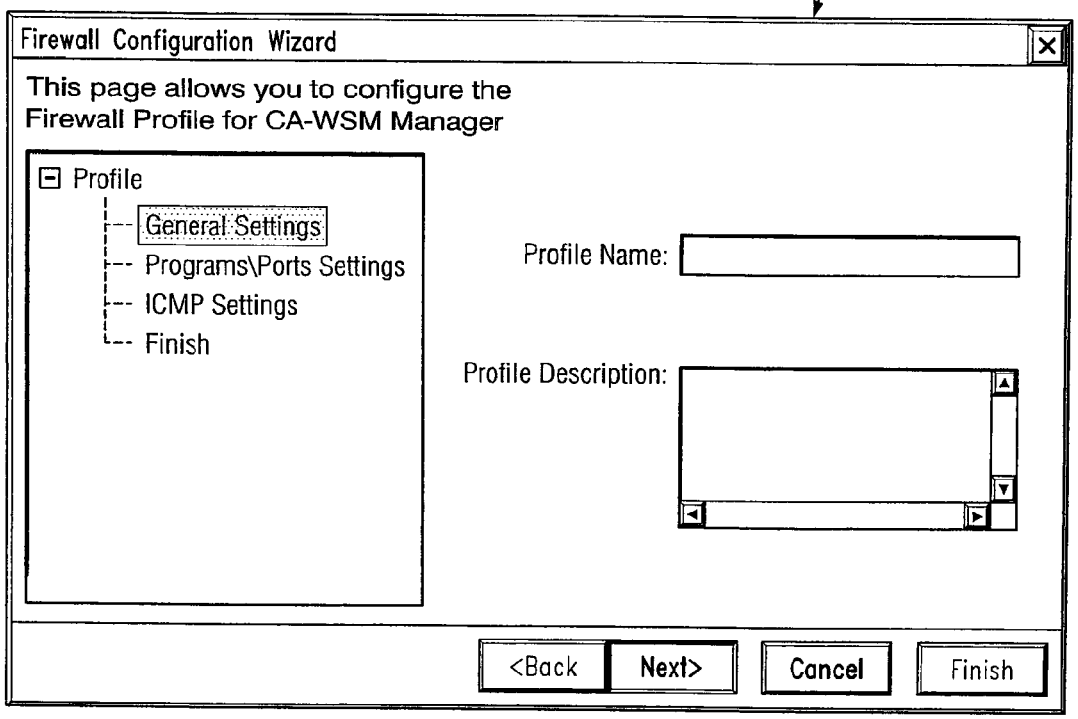
FIGS. 9A-C illustrate exemplary graphical user interfaces associated with one of the firewall profiles of FIG. 6 in accordance with one embodiment of the present disclosure.
Figure 9B:
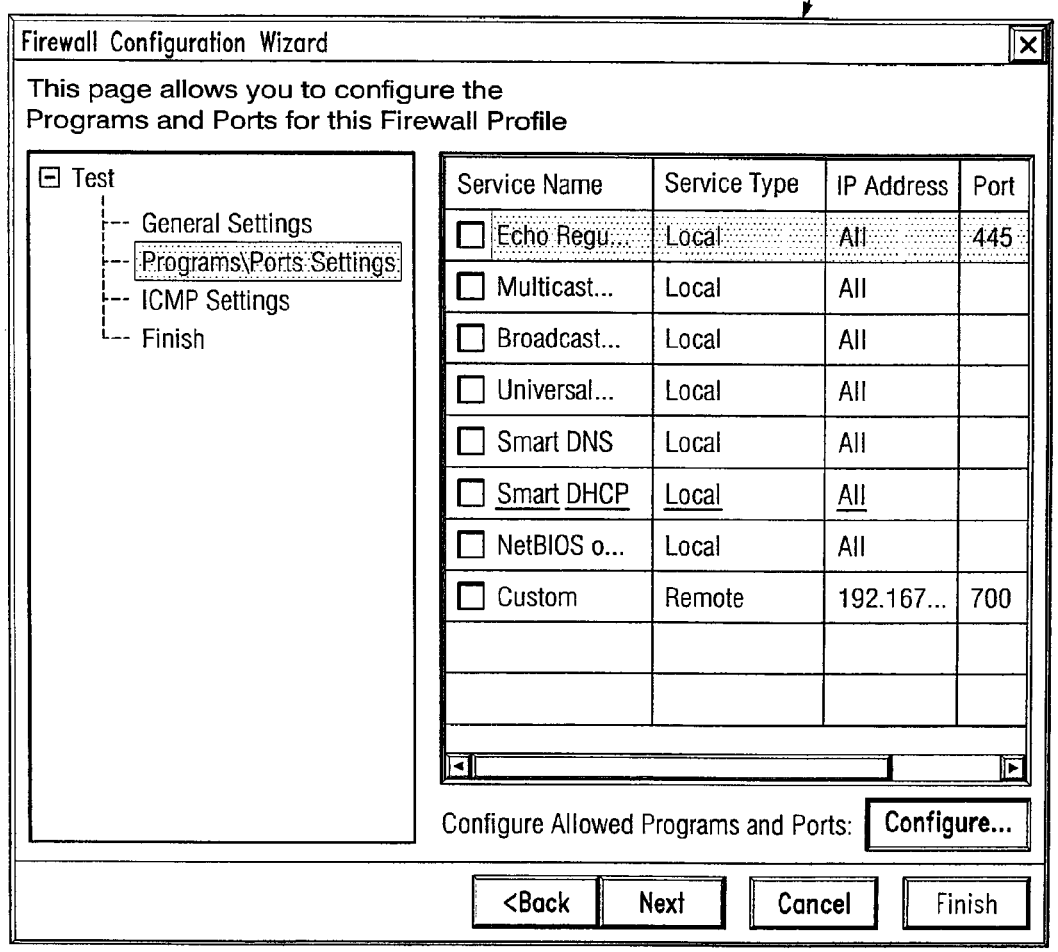
Figure 9C:
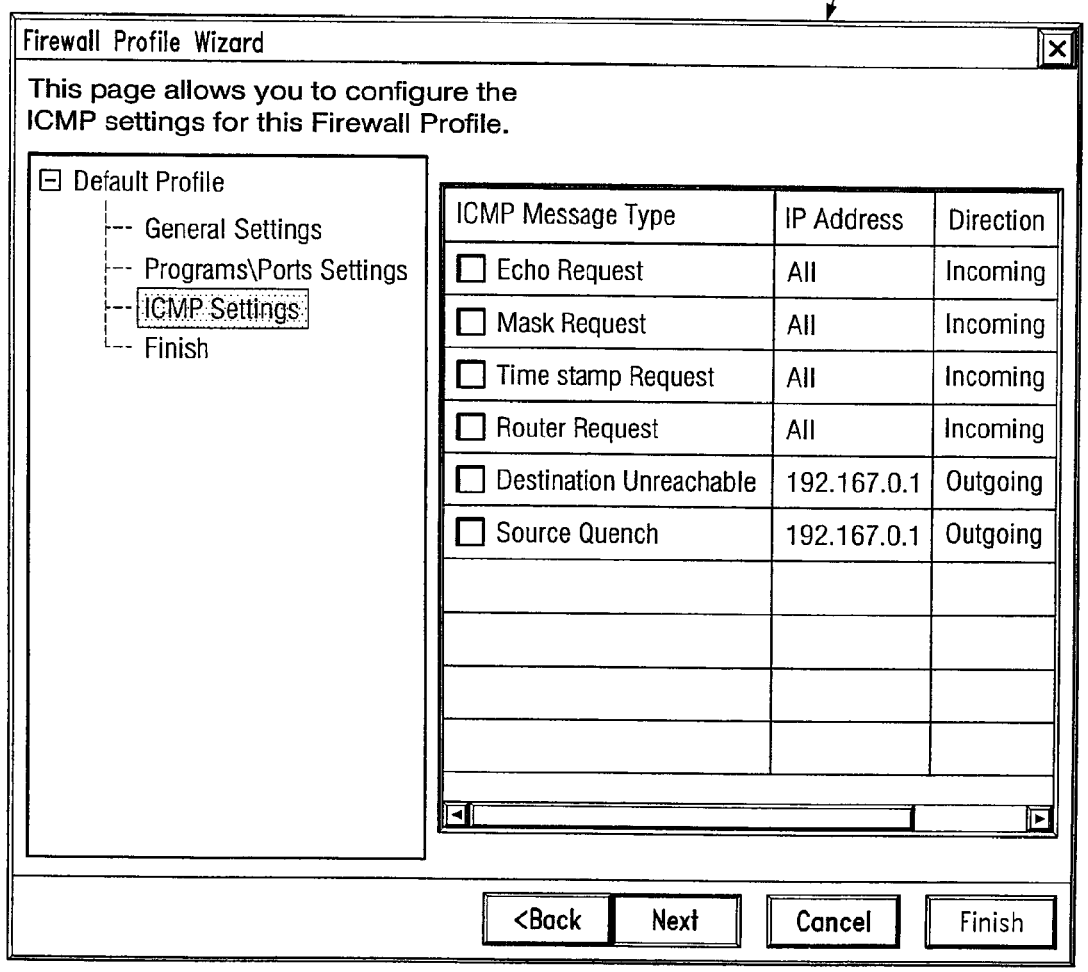

Referring to FIG. 6, method 600 begins at step 602 where security manager 130 receives a request to generate a firewall profile. As mentioned above, the request may be a selection via graphical user interface 116 presented by client 104. Next, at step 604, security manager 130 receives general setting parameters. For example, security manager 130 may receive a profile name and profile description (see FIG. 9A). At step 606, security manager 130 receives programs and/or ports settings allowing the user to allow or block programs/ports from inward/outward traffic. For example, security manager 130 may present graphical user interface 116 including a table enabling the user to select services associated with particular ports (see FIG. 9B). At step 608, security manager 130 receives Internet Control Message Protocol (ICMP) setting parameters to allow or block inward/outward ICMP traffic. In some embodiments, security manager 130 may present a list of predefined ICMP rules to select from (see FIG. 9C).

Although this disclosure has been described in terms of certain embodiments and generally associated methods, alterations and permutations of these embodiments and methods will be apparent to those skilled in the art. For example, certain embodiments of system 100 may be operable to i) secure wireless local area network connections by effective generation, deployment, rotation and synchronization of encryption keys; ii) enforce site-specific wireless local area network security by defining access zones and restricting access to authorized enterprise employees; and/or iii) manage and monitor configuration, performance and quality of wireless local area networks by automatically allocating channels, load balancing, and event management. Accordingly, the above description of example embodiments does not define or constrain this disclosure. Other changes, substitutions, and alterations are also possible without departing from the scope of this disclosure.

What is claimed is:

1. A processor for executing a wireless manager to configure and secure wireless access to a network, wherein the processor is configured to:

display a graphical user interface that includes a map associated with a location in a network and multiple access points associated with the location in the network;

generate an access zone that identifies a geographic space associated with the location in the network in response to one or more inputs to the graphical user interface, wherein the one or more inputs to the graphical user interface define a polygon region that corresponds to the geographic space associated with the access zone;

triangulate a physical position associated with a client device that requested wireless access to the network relative to the geographic space associated with the access zone, wherein the access zone includes one or more security parameters that control wireless access to the network relative to the geographic space associated with the access zone; and authorize the client device to wirelessly access the network if the physical position associated with the client device does not violate the one or more security parameters associated with the access zone that control wireless access to the network.

2. The processor recited in claim 1, wherein the processor is further configured to receive one or more signal strength measurements associated with the client device from one or more of the multiple access points associated with the location in the network, wherein the client device connected to the one or more of the multiple access points to request the wireless access to the network.

3. The processor recited in claim 2, wherein the processor is further configured to execute a three-dimensional calculation with a projection onto a two-dimensional x-y plane based on the one or more signal strength measurements to triangulate the physical position associated with the client device based on the projection onto the two-dimensional x-y plane and a z-axis height associated with the one or more of the multiple access points.

4. The processor recited in claim 3, wherein the location in the network includes a building, the z-axis height associated with the one or more of the multiple access points depends on a floor in the building associated with the one or more of the multiple access points, and the triangulated physical position associated with the client device combines the projection onto the two-dimensional x-y plane with a desk height on the floor in the building associated with the one or more of the multiple access points.

5. The processor recited in claim 2, wherein the processor is further configured to use one or more matrix algorithms to calculate an expected x, y, z position associated with the client device with a projection onto a two-dimensional x-y plane based on the one or more signal strength measurements to triangulate the physical position associated with the client device based on the projection onto the two-dimensional x-y plane and sixty-degree sectors associated with the one or more of the multiple access points.

6. The processor recited in claim 2, wherein the processor is further configured to use one or more matrix algorithms to calculate an expected x, y, z position associated with the client device with a projection onto a two-dimensional x-y plane based on the one or more signal strength measurements to triangulate the physical position associated with the client device based on the projection onto the two-dimensional x-y plane and propagation models that address frequencies associated with the one or more of the multiple access points.

7. The processor recited in claim 1, wherein the physical position associated with the client device does not violate the one or more security parameters that control wireless access to the network if the physical position associated with the client device is inside the geographic space associated with the access zone.

8. The processor recited in claim 7, wherein the processor is further configured to cause a wireless agent executing on the client device to disable wireless access to the network if the client device exits the geographic space associated with the access zone.

9. The processor recited in claim 1, wherein the physical position associated with the client device violates the one or more security parameters that control wireless access to the network if the physical position associated with the client device is inside the geographic space associated with the access zone.

10. A method for configuring and securing wireless access to a network, comprising:

displaying a graphical user interface that includes a map associated with a location in a network and multiple access points associated with the location in the network;

generating, by a processor executing a wireless manager, an access zone that identifies a geographic space associated with the location in the network in response to one or more inputs to the graphical user interface that define a polygon region that corresponds to the geographic space associated with the access zone;

triangulating, by the processor executing the wireless manager, a physical position associated with a client device that requested wireless access to the network relative to the geographic space associated with the access zone, wherein the access zone includes one or more security parameters that control wireless access to the network relative to the geographic space associated with the access zone; and authorizing, by the processor executing the wireless manager, the client device to wirelessly access the network if the physical position associated with the client device does not violate the one or more security parameters associated with the access zone that control wireless access to the network.

11. The method recited in claim 10, further comprising receiving, at the processor executing the wireless manager, one or more signal strength measurements associated with the client device from one or more of the multiple access points associated with the location in the network, wherein the client device connected to the one or more of the multiple access points to request the wireless access to the network.

12. The method recited in claim 11, further comprising executing, on the processor, a three-dimensional calculation with a projection onto a two-dimensional x-y plane based on the one or more signal strength measurements to triangulate the physical position associated with the client device based on the projection onto the two-dimensional x-y plane and a z-axis height associated with the one or more of the multiple access points.

13. The method recited in claim 12, wherein the location in the network includes a building, the z-axis height associated with the one or more of the multiple access points depends on a floor in the building associated with the one or more of the multiple access points, and the triangulated physical position associated with the client device combines the projection onto the two-dimensional x-y plane with a desk height on the floor in the building associated with the one or more of the multiple access points.

14. The method recited in claim 11, further comprising using, by the processor, one or more matrix algorithms to calculate an expected x, y, z position associated with the client device with a projection onto a two-dimensional x-y plane based on the one or more signal strength measurements to triangulate the physical position associated with the client device based on the projection onto the two-dimensional x-y plane and sixty-degree sectors associated with the one or more of the multiple access points.

15. The method recited in claim 11, further comprising using, by the processor, one or more matrix algorithms to calculate an expected x, y, z position associated with the client device with a projection onto a two-dimensional x-y plane based on the one or more signal strength measurements to triangulate the physical position associated with the client device based on the projection onto the two-dimensional x-y plane and propagation models that address frequencies associated with the one or more of the multiple access points.

16. The method recited in claim 10, wherein the physical position associated with the client device does not violate the one or more security parameters that control wireless access to the network if the physical position associated with the client device is inside the geographic space associated with the access zone.

17. The method recited in claim 16, further comprising causing, by the processor, a wireless agent executing on the client device to disable wireless access to the network if the client device exits the geographic space associated with the access zone.

18. The method recited in claim 10, wherein the physical position associated with the client device violates the one or more security parameters that control wireless access to the network if the physical position associated with the client device is inside the geographic space associated with the access zone.

* * * * *